United States Patent
Trishaun

(10) Patent No.: US 10,446,004 B2
(45) Date of Patent: *Oct. 15, 2019

(54) SYSTEM FOR MONITORING STATE OF USER AND RELATED METHODS

(71) Applicant: Marquette Trishaun, Fulton, GA (US)

(72) Inventor: Marquette Trishaun, Fulton, GA (US)

(*) Notice: Subject to any disclaimer, the term of this patent is extended or adjusted under 35 U.S.C. 154(b) by 0 days.

This patent is subject to a terminal disclaimer.

(21) Appl. No.: 16/271,969

(22) Filed: Feb. 11, 2019

(65) Prior Publication Data

US 2019/0188986 A1     Jun. 20, 2019

Related U.S. Application Data

(63) Continuation of application No. 15/722,278, filed on Oct. 2, 2017, now Pat. No. 10,204,498.

(60) Provisional application No. 62/404,348, filed on Oct. 5, 2016, provisional application No. 62/403,152, filed on Oct. 2, 2016, provisional application No. 62/404,383, filed on Oct. 5, 2016.

(51) Int. Cl.

| | |
|---|---|
| *G08B 1/08* | (2006.01) |
| *G08B 21/02* | (2006.01) |
| *H04W 88/06* | (2009.01) |
| *G08B 21/22* | (2006.01) |
| *G08B 25/00* | (2006.01) |

(52) U.S. Cl.
CPC .......... *G08B 21/02* (2013.01); *G08B 21/0211* (2013.01); *G08B 21/22* (2013.01); *G08B 25/006* (2013.01); *G08B 25/009* (2013.01); *H04W 88/06* (2013.01)

(58) Field of Classification Search
None
See application file for complete search history.

(56) References Cited

U.S. PATENT DOCUMENTS

| | | |
|---|---|---|
| 5,544,661 A | 8/1996 | Davis et al. |
| 6,512,456 B1 | 1/2003 | Taylor, Jr. |
| 6,992,580 B2 | 1/2006 | Kotzin et al. |
| 7,154,398 B2 | 12/2006 | Chen et al. |
| 7,259,671 B2 | 8/2007 | Ganley et al. |
| 7,973,657 B2 | 7/2011 | Ayed |
| 7,978,063 B2 | 7/2011 | Baldus et al. |
| 8,107,920 B2 | 1/2012 | Ben Ayed |
| 8,228,188 B2 | 7/2012 | Key et al. |
| 8,618,930 B2 | 12/2013 | Papadopoulos et al. |
| 8,721,554 B2 | 5/2014 | Lin et al. |
| 8,756,078 B2 | 6/2014 | Collins, Jr. et al. |
| 8,870,785 B2 | 10/2014 | Muehlsteff et al. |
| 8,966,235 B2 | 2/2015 | Dicks et al. |

(Continued)

*Primary Examiner* — Adolf Dsouza
(74) *Attorney, Agent, or Firm* — Allen, Dyer, Doppelt + Gilchrist, PA

(57) ABSTRACT

A system includes a server, a local base station including first and second wireless transceivers, the first wireless transceiver configured to communicate with the server over an external network, and a personal monitoring device adjacent the user. The personal monitoring device includes a local wireless transceiver configured to communicate with the second wireless transceiver of the local base station, sensors configured to monitor corresponding different characteristics of the user, each different characteristic having a desired range, and a controller coupled to the local wireless transceiver and the sensors. The controller is configured to send an alert to the local base station when a different characteristic exceeds a respective desired range.

20 Claims, 16 Drawing Sheets

(56) References Cited

U.S. PATENT DOCUMENTS

| | | |
|---|---|---|
| 9,177,459 B2 | 11/2015 | Sholder |
| 2004/0199056 A1 | 10/2004 | Husemann et al. |
| 2009/0273467 A1 | 11/2009 | Elixmann et al. |
| 2010/0249633 A1 | 9/2010 | Droitcour et al. |
| 2011/0215922 A1 | 9/2011 | Armstrong |
| 2016/0116343 A1 | 4/2016 | Dixon et al. |
| 2017/0340221 A1 | 11/2017 | Cronin et al. |
| 2018/0047121 A1 | 2/2018 | Bhattacharyya |

SYSTEM FOR MONITORING STATE OF USER AND RELATED METHODS

RELATED APPLICATIONS

This application is a continuation of U.S. application Ser. No. 15/722,278 filed Oct. 2, 2017, which is based upon prior filed Application No. 62/404,383 filed Oct. 5, 2016, Application No. 62/404,348, filed Oct. 5, 2016, and Application No. 62/403,152, filed Oct. 2, 2016 the entire subject matter of which is incorporated herein by reference in its entirety.

TECHNICAL FIELD

The present disclosure relates to health monitoring devices, and more particularly, to a user monitoring system and related methods.

BACKGROUND

As reported by the Centers for Disease Control (CDC), in the United States 117 million people have chronic health conditions. In addition to this, one out of four elderly persons experience a fall each year, with fewer than half informing a doctor or medical professional. Patient monitoring systems provide their users and healthcare providers the ability to monitor patients remotely in the event of complications such as heart attacks or falls.

Many prior attempts on remote patient monitoring systems allow limited patient location tracking or monitor only physiological data for use of healthcare officials. In the case of the latter, monitoring exclusively physiological data such as blood pressure or heart rate may not allow for reporting of events such as over exposure to sun light or the patient experiencing a fall. This results in emergency response not being received when most necessary.

Many current state-of-the-art patient tracking systems offer exclusively room level tracking. Some return patient location only when specific conditions are met, such an example would be when a patient leaves a room. These limitations render the tracking features unusable if the patient leaves the facility, additionally this offers no way to establish the location of the patient once the patient has left the room. This is due to the systems use of radiofrequency identification (RFID) and/or WiFi (i.e. wireless local area networking based on the IEEE 802.11 standard) for delivering location exclusively at choke points such as an entry/exit. Furthermore, many systems lack secondary power sources or alternative means of battery recharging. This introduces constraints to the time available to locate a patient in need.

SUMMARY

Generally, a system is for monitoring a state of a user. The system may include a server, and a local base station comprising first and second wireless transceivers. The second wireless transceiver may operate on a different operational frequency than that of the first wireless transceiver, and the first wireless transceiver may be configured to communicate with the server. The system also may include at least one personal monitoring device adjacent the user. The at least one personal monitoring device may comprise at least one local wireless transceiver configured to communicate with the second wireless transceiver of the local base station, provide a connection between the at least one personal monitoring device and the server, and transmit a beacon alert to a mobile wireless communications device of the user when outside a range of the local base station, at least one sensor configured to monitor at least one user characteristic the at least one user characteristic having a desired range, and a controller coupled to the at least one local wireless transceiver and the at least one sensor. The controller may be configured to send an alert to the local base station when at least one different characteristic exceeds a respective desired range.

More specifically, the local base station may be configured to relay the alert to the server. The at least one personal monitoring device may comprise a broadcast transmitter coupled to the controller and configured to broadcast the beacon alert when outside the range of the local base station. The broadcast transmitter may comprise at least one of a very high frequency (VHF) transmitter and an ultra-high frequency (UHF) transmitter, for example.

In some embodiments, the local base station may be configured to determine a sub-room location of the at least one personal monitoring device. The at least one user characteristic may comprise one or more of a heartrate of the user, movement of the user, ultraviolet (UV) exposure of the user, a breathing pattern of the user, and a geolocation of the user.

The at least one sensor may comprise a radar sensor configured to monitor the breathing pattern of the user. The at least one personal monitoring device may be carried by the user and has at least one of a bracelet form factor and a pendant form factor. The at least one personal monitoring device may comprise a passive radio frequency (RF) transponder coupled to the controller.

Another aspect is directed to a method for making a system for monitoring a state of a user. The method may include providing a local base station comprising first and second wireless transceivers. The first wireless transceiver may be configured to communicate with a server, and the second wireless transceiver may operate on a different operational frequency than that of the first wireless transceiver. The method may also comprise providing at least one personal monitoring device adjacent the user. The at least one personal monitoring device may include at least one local wireless transceiver configured to communicate with the second wireless transceiver of the local base station, provide a connection between the at least one personal monitoring device and the server, and transmit a beacon alert to a mobile wireless communications device of the user when outside a range of the local base station, at least one sensor configured to monitor a user characteristic the at least one user characteristic having a desired range, and a controller coupled to the at least one local wireless transceiver and the at least one sensor. The controller may be configured to send an alert to the local base station when at least one different characteristic exceeds a respective desired range.

DETAILED DESCRIPTION

Figure 1:
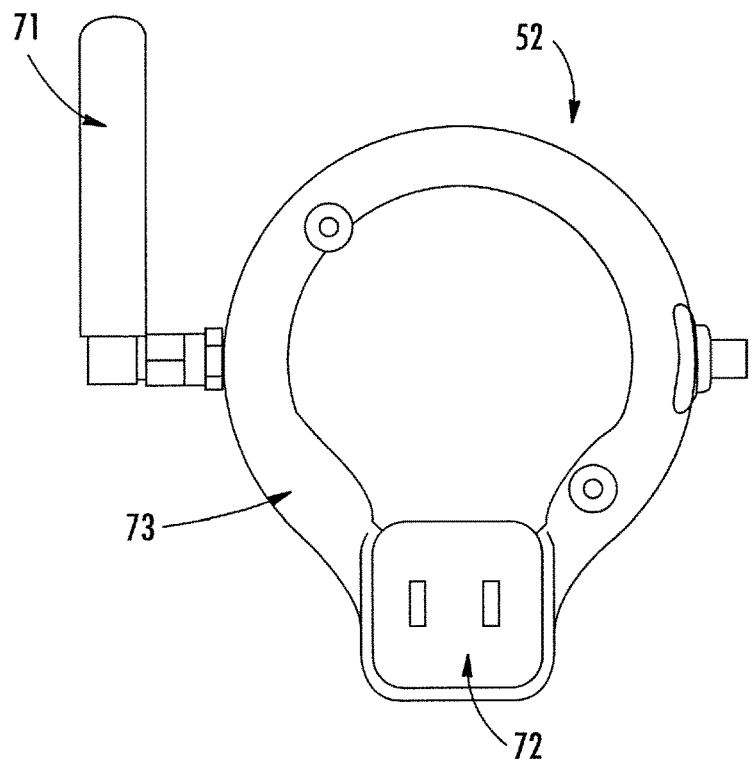
FIG. 1 is a schematic diagram of a local base station, according to the present disclosure.

The present disclosure will now be described more fully hereinafter with reference to the accompanying drawings, in which several embodiments of the invention are shown. This present disclosure may, however, be embodied in many different forms and should not be construed as limited to the embodiments set forth herein. Rather, these embodiments are provided so that this disclosure will be thorough and complete, and will fully convey the scope of the present disclosure to those skilled in the art. Like numbers refer to like elements throughout, and base 100 reference numerals are used to indicate similar elements in alternative embodiments.

Ekahau W4 is an existing device, available from Cisco Systems, Inc. of San Jose, Calif. The Ekahau W4 wearable WiFi tag offer real-time location with room and sub-room accuracy. The device is wrist mounted and features two-way communication over WiFi, Active RFID assisted real-time location, 3D-accelerometer for motion detection along with included software for communication. Although the device allows for patient tracking and communication, lacking are the means for vital monitoring, aid dispatch incapacitated patients, or tools for ensure compliancy with medication or physical activity requirements. In, short the Ekahua W4 and similar devices do not provide a comprehensive method for monitoring and providing real time aid.

The Universal Reader 52 contains modules 71 that allow for communication across multiple bandwidths and standards including WiFi, UHF, Bluetooth, and long term evolution (LTE). This renders the universal reader capable of receiving over-the-air (OTA) updates, allowing for software and firmware updates to be made wirelessly. The Universal Reader receives power from standard domestic outlets 72. In the case of outages, the Universal Reader houses a backup power source which shall be charge during normal operation, also included is the ability to charge via solar energy.

The Universal Reader's housing 73 features a sturdy and weather proof design allowing for outdoor placement and resistance to tampering.

Figure 2A:
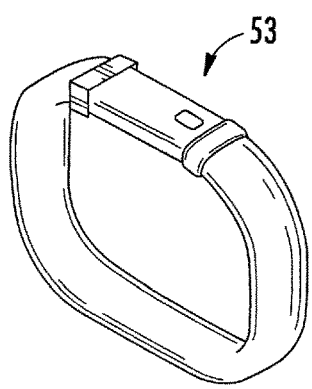
FIGS. 2A-2C are schematic views of a personal monitoring device, according to the present disclosure.
Figure 2B:
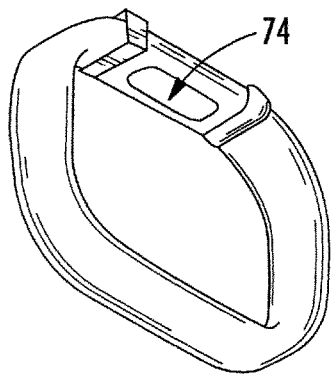
Figure 2C:
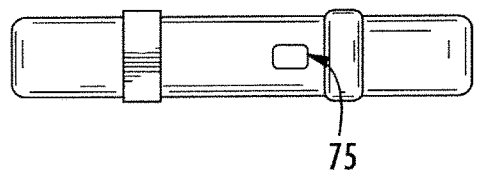
Figure 3A:
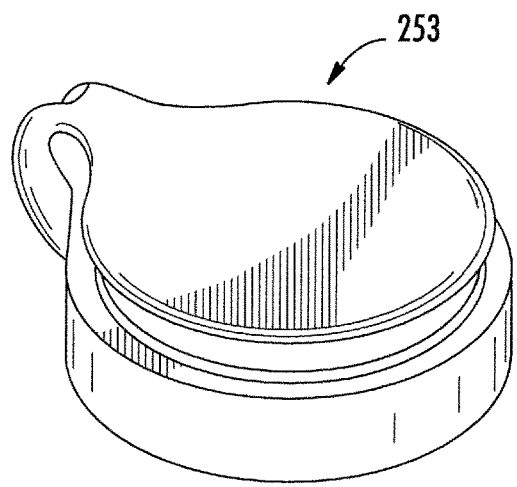
FIGS. 3A-3D are schematic views of another embodiment of the personal monitoring device, according to the present disclosure.
Figure 3B:
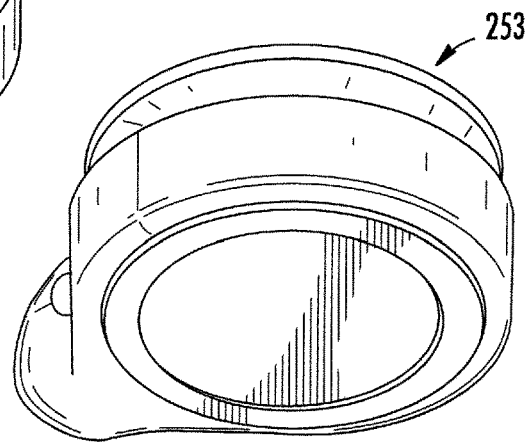
Figure 3C:
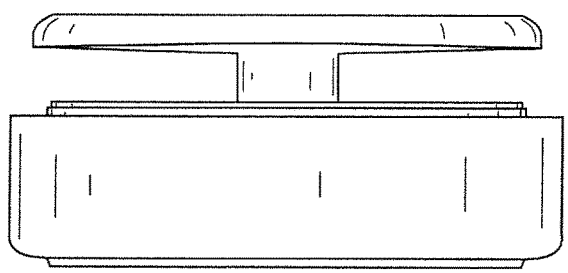
Figure 3D:
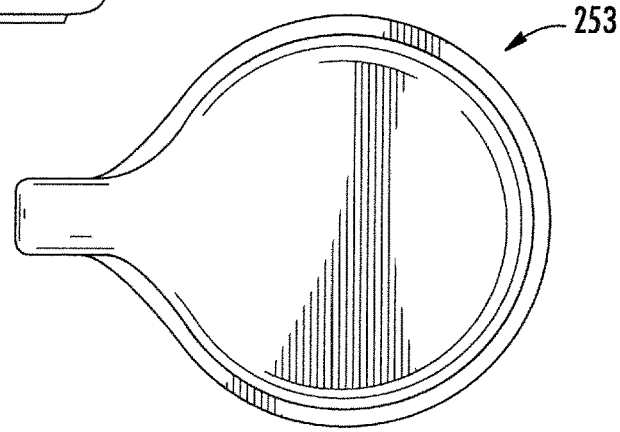
Figure 4:
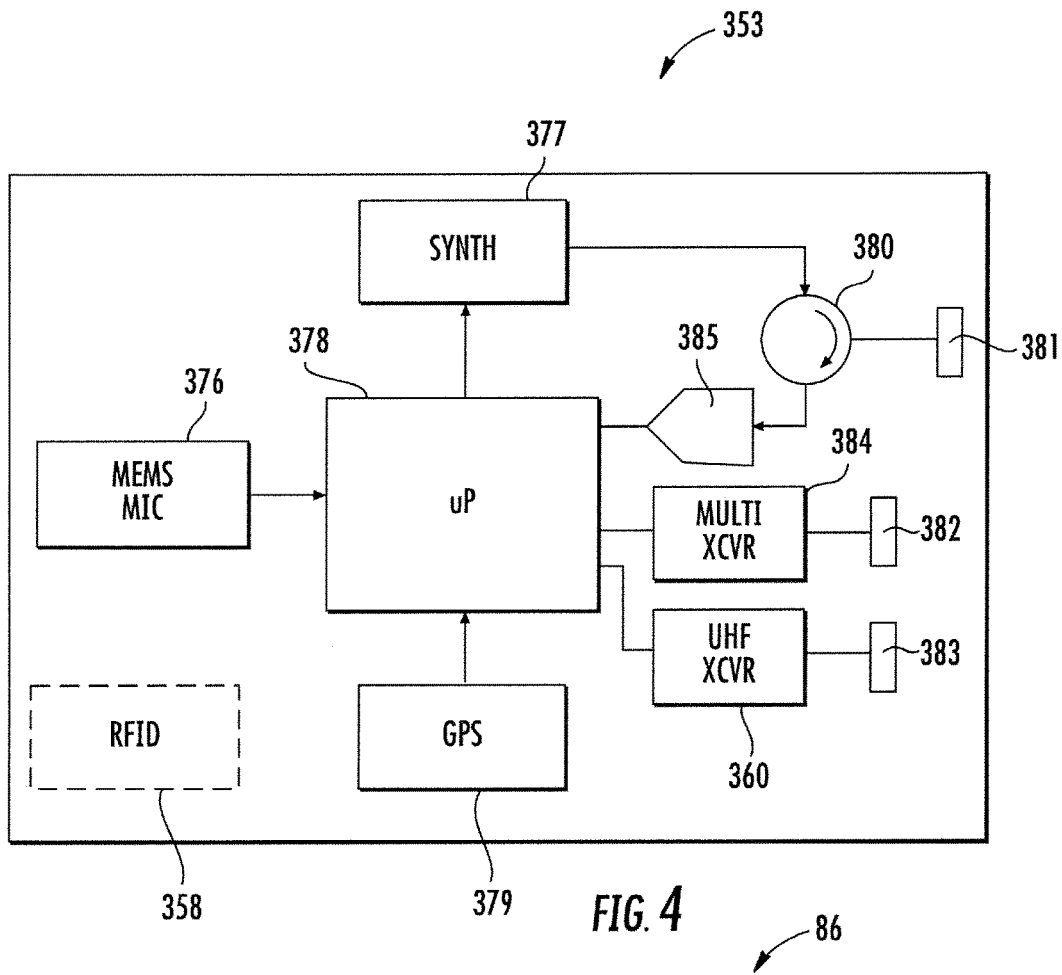
FIG. 4 is a schematic diagram of another embodiment of the personal monitoring device, according to the present disclosure.
Figure 5:
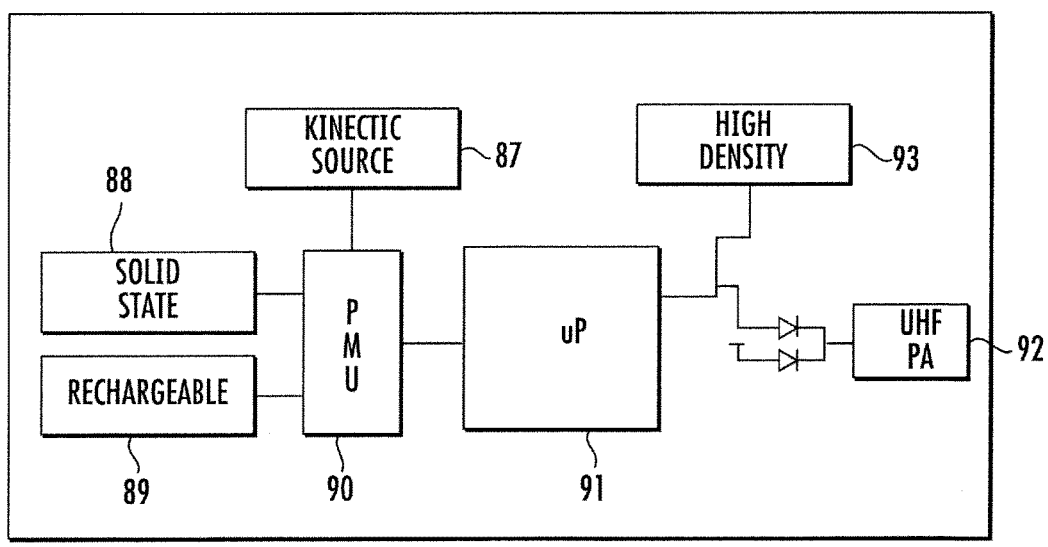
FIG. 5 is a schematic diagram of a power circuit in yet another embodiment of the personal monitoring device, according to the present disclosure.

Wearable beacons come in two variations, a bracelet 53, shown in FIG. 2, to be worn on the patient's or monitored person's wrist and a pendent, shown in FIG. 3. Both configurations offer the same features. The bracelet is secured onto the monitored person wrist through the use of tamper resistant straps. The underside of the bracelet houses a pulse sensor 74 for monitoring heartrate. In the case of unusual heartrate readings, the user shall be made known of the event by way of alert sent by Universal Reader. The bracelet shall also monitor patient or monitored person's sunlight exposure through the use of a UV sensor 75, located on the top of the bracelet. Inside the wearable is an Inertial Measure Unit (IMU) which shall monitor patient movement. In the event of unusual movement, such as the bracelet recording a fall, an alert shall be sent. The bracelet shall also have the ability to send situational alerts based on the type of inertial stimuli recorded, such as a patient tapping on the bracelet face representing a request for assistance needed by the patient.

Pendent variations 253 offer the same feature set as the bracelet configuration. The pendent design allows for the beacon to be carried or worn along the neck of the monitored person. Housed inside the pendent are the heartrate sensor, UV sensor, and IMU along with their accompanying uses and features detailed hereinabove.

At the heart of the real time location sensor (RLS) sensor 353 is a low power microprocessor 378 capable of exiting low-power mode by interrupt driven events at its input ports. The microelectromechanical (MEMS) microphone 376 is the primary interrupt driven event which wakes the processor on the detection of auditory alerts from the person of monitoring. The RF synthesizer 377 comprises a phase locked loop (PLL) and software defined radio 380-381, 385 for demodulation of the continuous wave signal transmitted and received by the patch antenna element. The cellular or global positioning system (GPS) module 379 is an off-the-shelf module similar in nature to the Qualcomm chip-set present in standard cellphone designs. The multi-radio module 382, 384 is an off-the-shelf solution that provides WiFi and Bluetooth using a single RF chain by means of a single fractal antenna tuned to approximately 2.42 GHz. The UHF band radio 360, 383 is tuned to provide alerts within the bandwidth of the first responders radio sets (i.e. Police car radio). When all other energy sources are depleted, the RLS sensor can still be located by means of the code contained on the radio frequency identification tag 358.

The power circuit 86 includes an onboard power management unit 90 (and other circuits 87-93), which shall utilize a hybrid power scheme intended to maximize the life of the sensor during the distress mode. During the normal day-to-day operation of the sensor, only the rechargeable battery will be in use. When the RLS sensor becomes low on power during normal operation, the sensor will send periodic alerts to the host monitoring system (i.e. ADT style security personnel) using the cellular module. The solid-state battery 88 is intended for use with an energy harvesting mechanism to convert natural energy sources (i.e. thermal and solar energy) for ultra-low-rate bursts using the RFID tag in a perpetual beacon mode.

Figure 6:
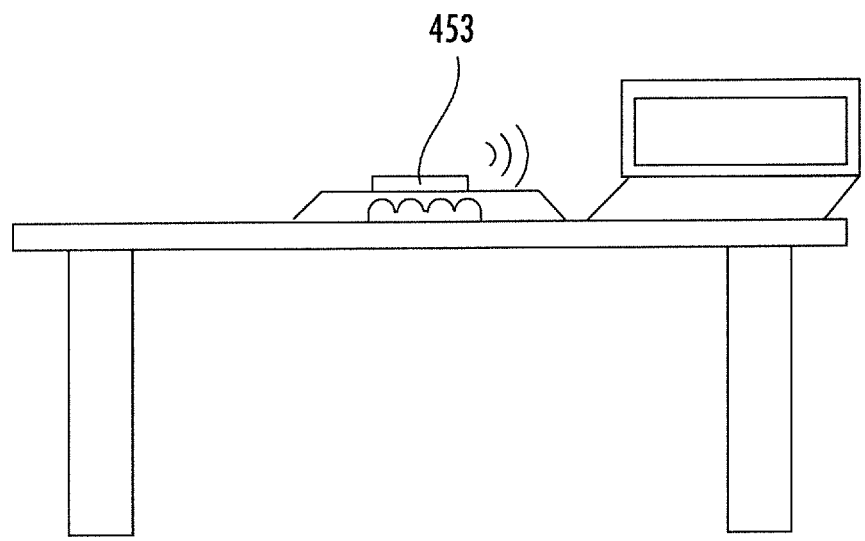
FIGS. 6-8 are schematic diagrams of other embodiments of the personal monitoring device, according to the present disclosure.

The sensor will recharge by air using an air-gap inductor transformer charging solution. While on the docking station, the RLS sensor 453 (FIG. 6) will be updatable via a Bluetooth connection to a host computer platform or tablet.

Figure 7:
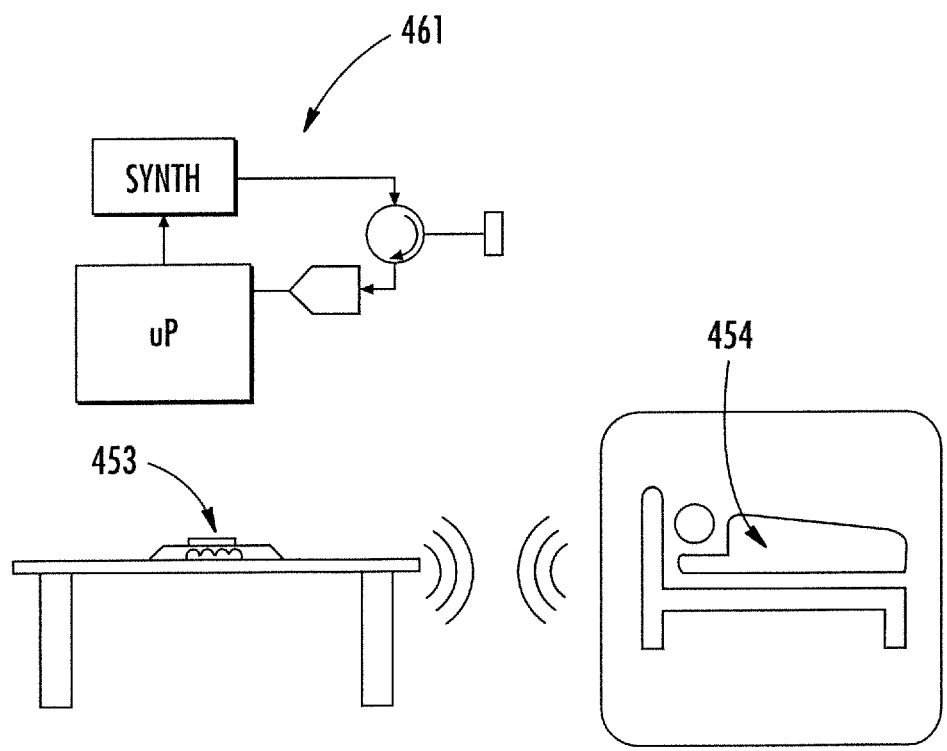

In FIG. 7, the sensor is capable of breather-detection 461 using the continuous wave radar where the microprocessor commands the synthesizer to sweep a (3%) bandwidth from a nominal carrier at a constant pulse repetition frequency (PRF) rate. The waveform is transmitted using a patch antenna and the Doppler reflections are received via a circulator or four-port coupler for processing using a software defined radio in the processor. Such a method will be used to detect a possible distress signal from a sleeping infant 454.

Figure 8:
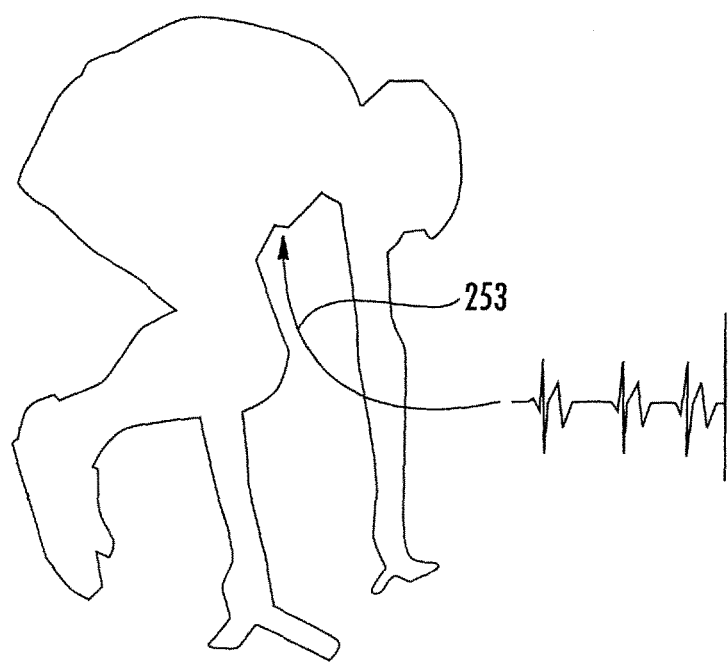

As shown in FIG. 8, in a similar manner to breather-detection the continuous wave radar is capable of monitoring other periodic signals like the rhythm of the human heart. Such a signal will be exploited using a support vector machine to detect cardiac arrest in a distressed runner. The said distress signal will alert using the cellular module to first responders the cardiac information over the wireless network including the distressed person's location.

Figure 9:
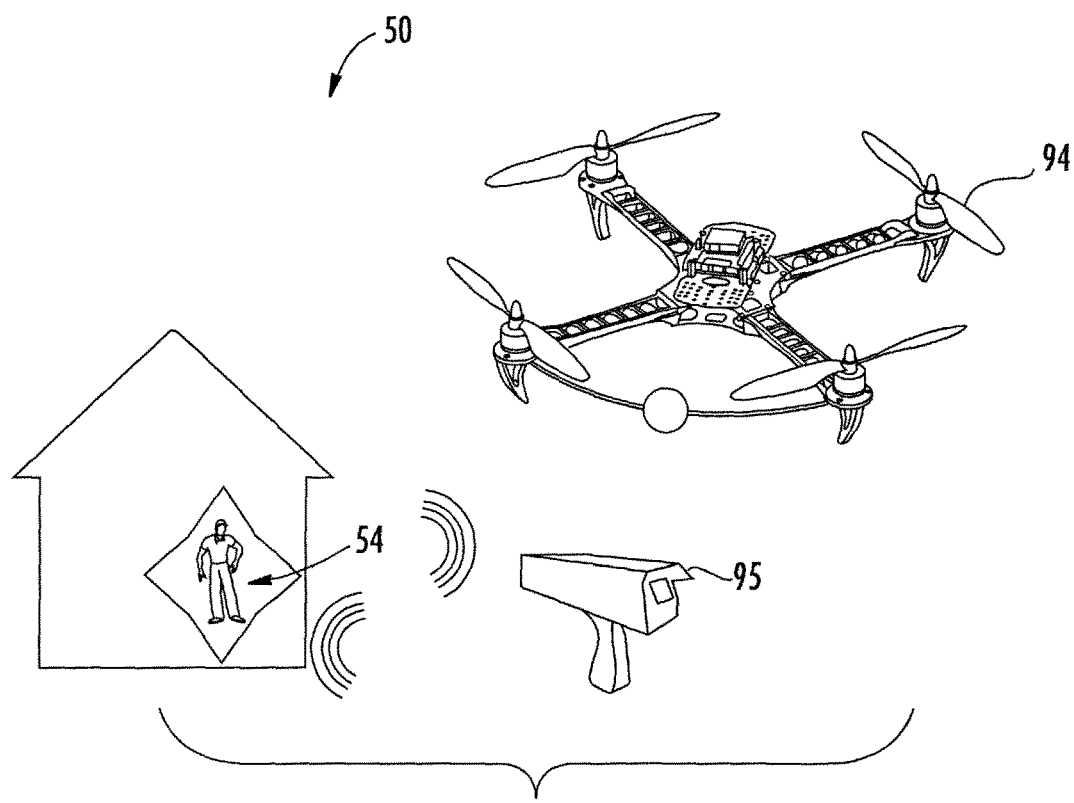
FIGS. 9-13 are schematic diagrams of varying elements of the system, according to the present disclosure.
Figure 10:
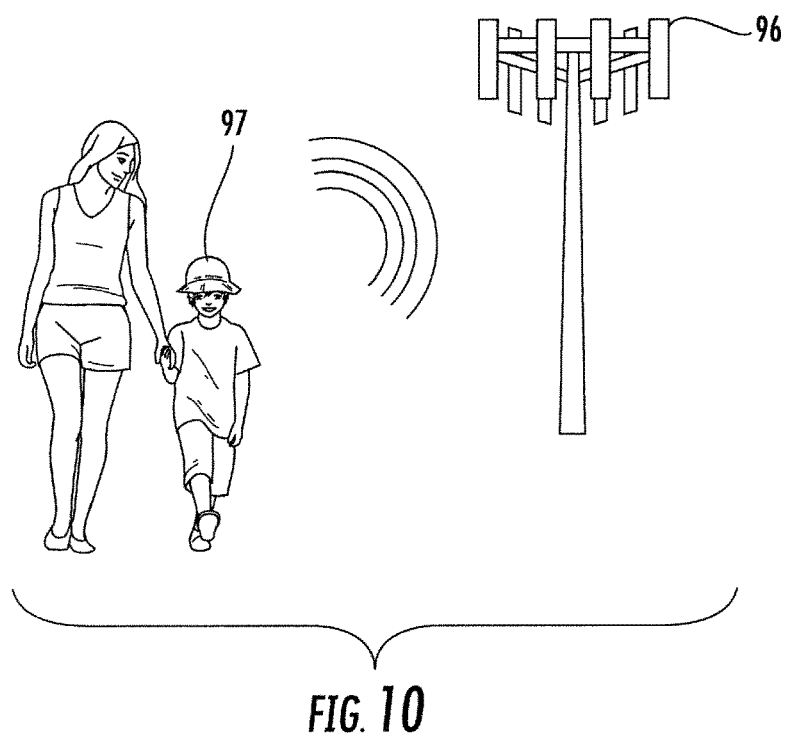
Figure 11:
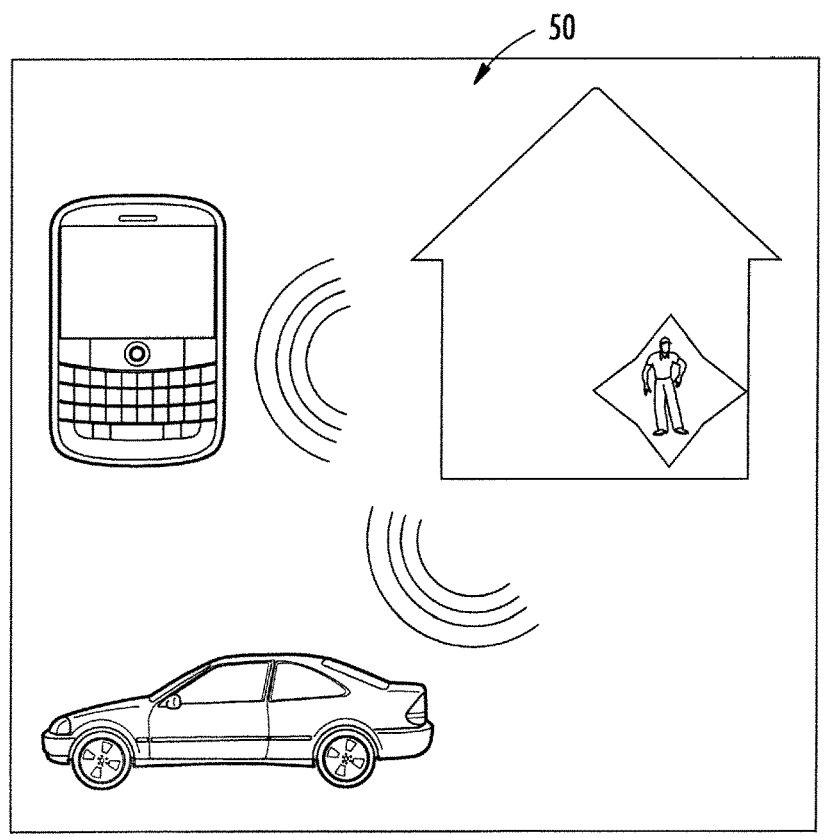

Referring now to FIGS. 9-11, when all other modes of the detection are no longer operable due to the depletion of all applicable energy sources. The distressed person 97 will still be locatable via the passive RFID contained on the sensor. In this scenario, the RFID reader 95 can be attached via a drone 94 or another mobile search unit like a quadcopter, for example.

When the sensor is alerted on a distressed user 54 during a kidnapping situation, the sensor shall immediately begin beaconing over cellular towers 96 the location of the distressed person to the appropriate response system such that the sensor shall maintain GPS precision of the said person. This is the critical phase of a kidnapping where amber alerts can be substantially enhanced by displaying the information on a sign for example that the person is approaching or within the said area.

As shown in diagram 50, the sensor will beacon over UHF band radios if it detects the radio within the area of the distressed person on a patrol car cruising the area. The sensor will beacon over WiFi if it detects any networks within the area. The sensor shall also broadcast itself to a home network with the wireless router name of (Distressed-Person-Unique Code). Unbeknownst to the suspect, if that individual is wearing a cellphone, the sensor will attempt to communicate over the radios in their cellphone to alert authorities to the individual. Both Android and the iOS operating system contain back-door software application programming interfaces (APIs) to support this provision.

Figure 12:
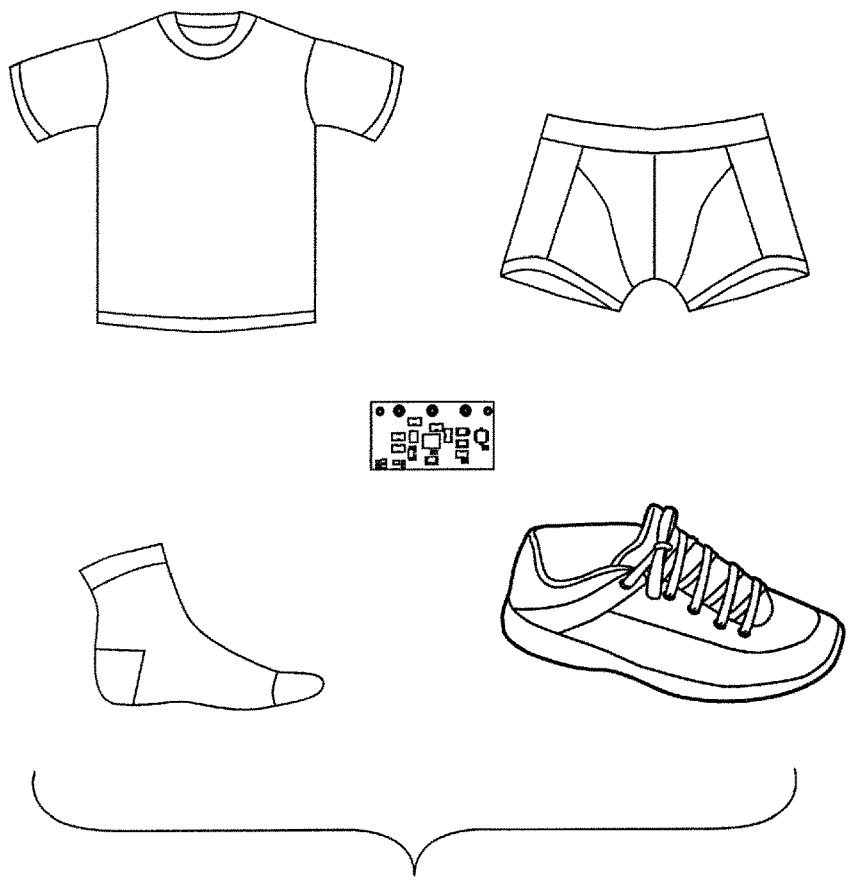

As shown in FIG. 12, the sensor can be concealed in several locations to include the collar of a shirt, the lining of underwear, within a sock, or shoe, along with other locations as imagined by the end user or parent. This is only possible due to the semi-rigid flexible nature of the circuit assembly.

Figure 13:
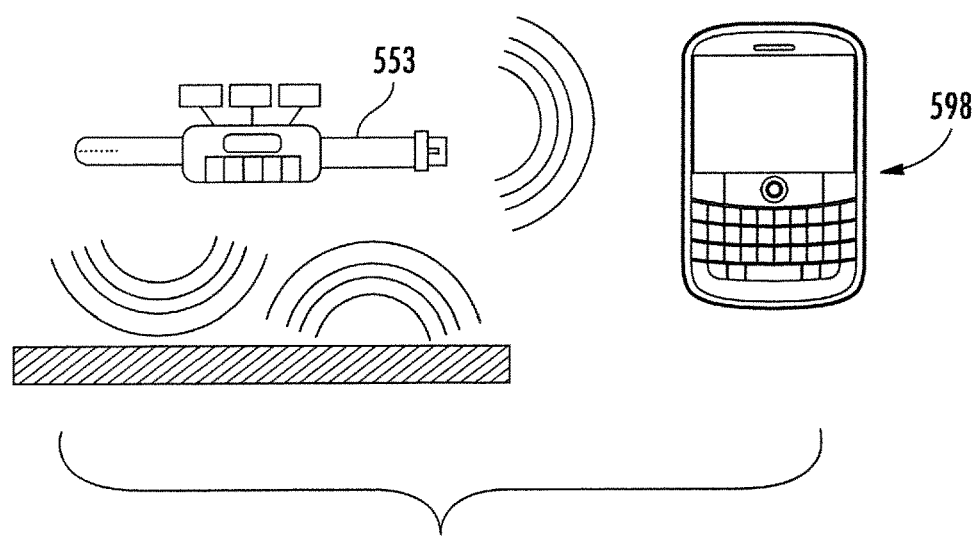
Figure 14:
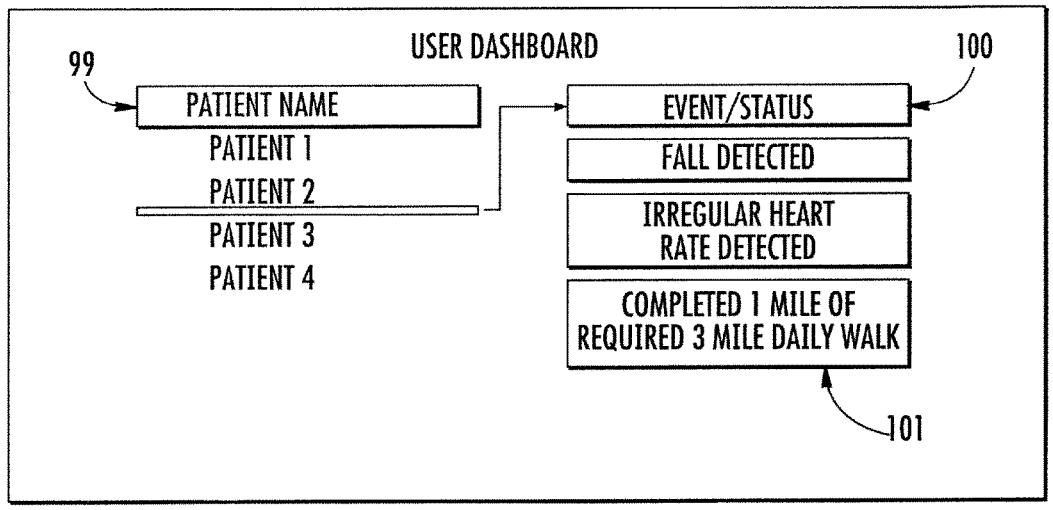
FIG. 14 is a view of an interface from a server in the system, according to the present disclosure.
Figure 15:
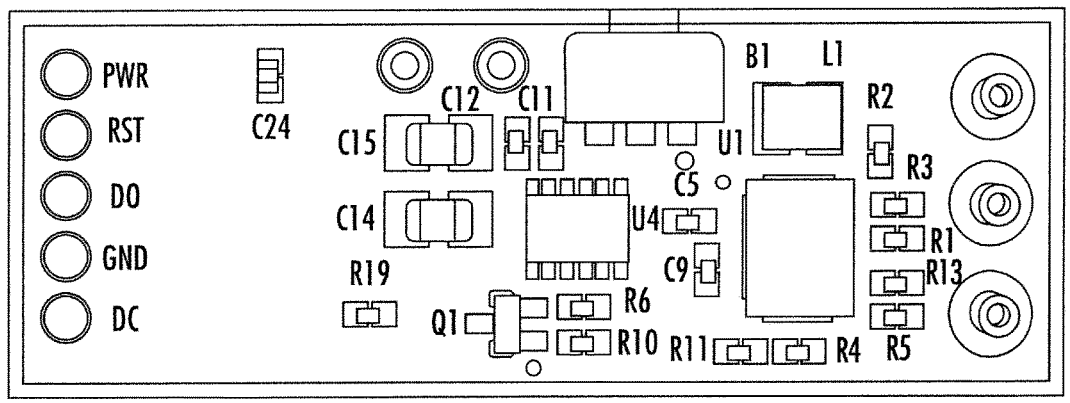
FIG. 15 is a schematic circuit diagram of yet another embodiment of the personal monitoring device, according to the present disclosure.

FIG. 13 depicts the embodiment of the sensor 553 and associated mobile device 598 during biometric/vital sign monitoring where it is not necessary to conceal the sensor in an inconspicuous manner. In the said embodiment, the following features are exploitable. The accelerometers and gyroscopes can be used to track metrics concerning the kinematic motion of the tracked person or animal. The temperature sensor shall record skin temperature as in contact with the neck or wrist. The MEMS microphone shall be capable of recording audio on-command to get a sense of distress in an ailing person or animal. The patch antennae for the continuous wave radar (see FIG. 1) shall be located in a manner for the radio waves to penetrate the skin to allow for manipulation of the quadrature/phase data to deduce the hydration level of the protected person or animal. The sensor will be mountable via armbands, but also other thermoplastic embodiments as dictated by the custom specifications from participating customers.

The Patient Monitoring system shall make use of a Cloud/web based application that allows the user to monitor patient vitals and status in addition to setting events or/and alerts based on user defined conditions. Application shall feature a dashboard 100 which shows the name of all patients or monitor persons 99 currently wearing an active wearable. Information 101 on each patient shall be available to the user, this information includes patient status such as vitals or biometrics in addition to user defined events or/and alerts, such as a detected fall. Users will also have the ability to set alerts and monitor conditions such as progress towards daily physical activity.

This patient monitoring system, is not intended for casual day-to-day monitoring of the tracked person. However, this hardware solution is capable of real time location through use of a web-based application in limited scenarios, such as a guardian monitoring a dependent/child. Additional novel features include the use of a MEMS device microphone to allow for programmable cord word/phase activated distress signals.

The system includes a WiFi module which allows for the detection of nearby personal home networks if the user or patient is within the range of a broadcasting WiFi device. The system includes a UHF band radio for broadcasting a distress signal within the bandwidth of first responder radios to alert the said responder to the distressed person within their sphere of patrol/coverage.

These systems include a RF transponder to assist with manhunt efforts where the partnered responder shall have a custom designed homing device capable of remote control access for collocation on an unmanned aerial vehicle (UAV) type system for broad scans of a remote area. The said mode is also intended to provide a means to locate the distressed person when all other onboard energy sources are completely discharged.

The electronic card assembly shall comprise both the circuit card, and a hybrid battery solution that relies on both a solid-state battery and energy-harvesting style mechanisms to maintain the minimal operation point of the sensor. An example of such technology is the kinetic motion used to power wrist watches. The sensor shall contain a high-energy cell that shall be activated via electro mechanical switch, and is intended as one-time high-energy-density power source (i.e. lithium battery) for the transmit tower level broadcasting of the distress beacon when the sensors normal battery is at a critical level.

The system will be powered by standard home outlets, during normal operation a secondary or backup power source shall be charged. The sensor shall also contain provisions for solar cell operation where exposure to sunlight is available per the specified embodiment. This allows for continued operation during times when power from the monitored area isn't available.

The system software suite running on the host mobile device/personal computer shall pinpoint the exact location of the tracked person using a leading mapping application (i.e. Google Maps etc.). The intended user will be able map a safe zone in GPS coordinates and shall set off the sensor if the tracked person is not handshake to the eligible person via bluetooth link. This is a mechanism intended to minimize false positives by having the sensor automatically disarm when with a parent etc.

The wireless link shall support the Bluetooth, UHF, VHF and LTE communication protocol. The chosen antenna and RF substrate are fully compatible with all competing lower-power standards/communication radios.

The systems include two mechanisms for setting off the distress signal. The first mechanism is a MEMS speaker for listening to programmable code word chosen by the end user. The second mechanism is the vital sign trigger which uses a continuous wave radar to sense compromised vitals (breathing and heart rate), and classify the event using a support vector machine to determine if a person has suffered an event such as cardiac arrest while exercising.

Wearable beacons shall be designed/packaged to be discrete. Allowing for concealment within clothing, bracelets, or other inconspicuous personal articles that will maintain with person during a kidnapping.

Wearable feature novel use of a continuous wave radar to sense vital signals. These signals include breathing, heart rate, and hydration level, and temperature of the protected person or animal. When aided by support-vector-machine classifiers, such data can be exploited to detect an impending heat-stroke.

This invention relates to the design of a personal area protection sensor that uses multiple RF sensors/transceivers for the real-time location of the distressed persons. Such a person may be in distress from but limited to the following scenarios; a missing person being constrained against their will, an incapacitated person due to a medical ailment (i.e. cardiac arrest etc.), or some other situation where they are unable to respond in person. This sensor is not limited to persons, and offers the flexibility to track lost assets beyond the current scope of GPS or cellular solutions. Other embodiments of the sensor will detail the use of the sensor for personal area protection of valuable livestock such as a show-horse, or ailing pet. Overall the biometric and kinematic data as recorded by this sensor will play host to a myriad of data-mining applications in the emerging market of cloud based E-Health care monitoring solutions.

The present invention relates generally to a multi-modal electronic reader for monitoring of persons using biometric signatures and electronic signatures where emitting from smart devices on person. The reader is capable of scanning, reading, and writing over multiple radio protocols and standards interface with existing network infrastructure and via a secure background radio link that polls and maintains the vitality of the reader as to provide critical communications in real time.

In home, office or hospice environments it is desirable to have the ability to remotely monitor equipment and personnel, patients, or clients. To date there exist no universally applicable for monitoring the stated environments. For instance, in the case of at home patient monitoring many prior attempts allow limited patient location tracking or monitor only physiological data, such as heart rate or blood pressure, for use of healthcare officials. In such a situation, it is desirable to know if the patient has sustained a fall or attempted to leave the premises. In the case of home or office environments another problem may involve allowing a person access to room while ensuring no attempts are made to access sensitive or potentially dangerous equipment. While some monitoring systems will provide a recording when personnel enter the area, this become impractical if the person in question is allow access to the room but not all equipment contained within.

To address these problems an Internet of Things (IOT) based sensor approach is desirable. Using an 'always connected' sensor that supports remote access and configuration over a network allows users to monitor conditions and receive real-time alerts while away from the vicinity. Furthermore, a host sensor capable of reading other smart devices and sensors allows for a mesh network of smart devices. Such a network expanding the area and conditions under monitor less daunting.

Generally described, the present invention includes multiple modes of communication including WiFi scanning and broadcasting and Bluetooth communication for use with additional home monitoring smart devices. Additionally, the invention makes use of the provided RF technologies for the identification of persons in the vicinity of the monitored area. Continuous wave radar is implemented to allow for additional monitoring features, such as vital monitoring.

The Multi-Modal includes communication over Bluetooth, WiFi, and cellular. This permits the reader to communicate with smart devices, more particularly, companion smart device made for use in monitoring persons or equipment remotely.

Additionally, WiFi and cellular modes of communication allow the reader to access webservers where data gather by the reader or companion smart devices can be stored and made available for the user. The use of web and cloud technologies allows for remote monitoring and real-time alerts that shall be sent to the user.

Identification methods within the reader are provided by Bluetooth and WiFi support. Each the aforementioned technologies contained unique identifies which allows devices to discern between two devices communicating using the same protocols. These unique identifies shall be used for identifying persons in the vicinity of the device.

Vital monitoring features with the reader are provided by novel use of a continuous wave radar to sense vital signals, such as breathing. Reader unit is powered through home or office outlets. Additionally, the reader can be wired into the main electrical network of a building when wall or ceiling mounted. Secondary sources of power include rechargeable power sources. These secondary power sources can be recharged via solar energy harvesting methods and trickle charge while primary power sources are active. This provides a backup power source in the base of power outages. In the event of complete power loss, the user shall be made aware of the system's status. Additionally, if universal reader unit is removed from primary power source it shall continue to operate so long of the secondary sources are active, users shall be made aware when removed from primary power source occurs.

Smart device data transmitted to reader unit is relayed to web app/servers or cloud solutions. Depending on use case, allows for real-time monitoring or datamining applications. The web application is a user accessible hub or dashboard where system behavior is customized. Additionally, this hub holds and displays alert information such as time of event, nature of the event, images captured during event if applicable, and audio recordings during event if applicable. Where if applicable means if the system is configured to take the specified action during the event.

Figure 16:
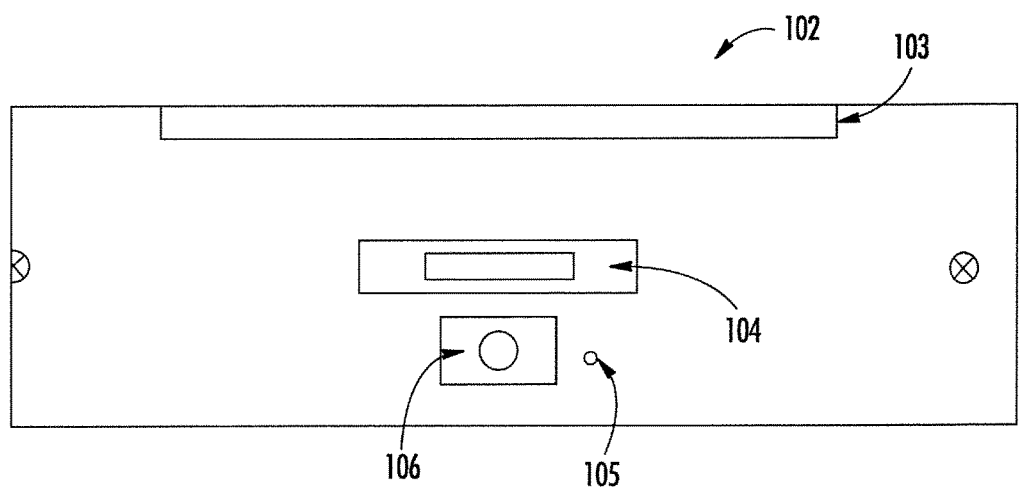
FIGS. 16-17 are schematic diagrams of different embodiments of the personal monitoring device, according to the present disclosure.
Figure 17:
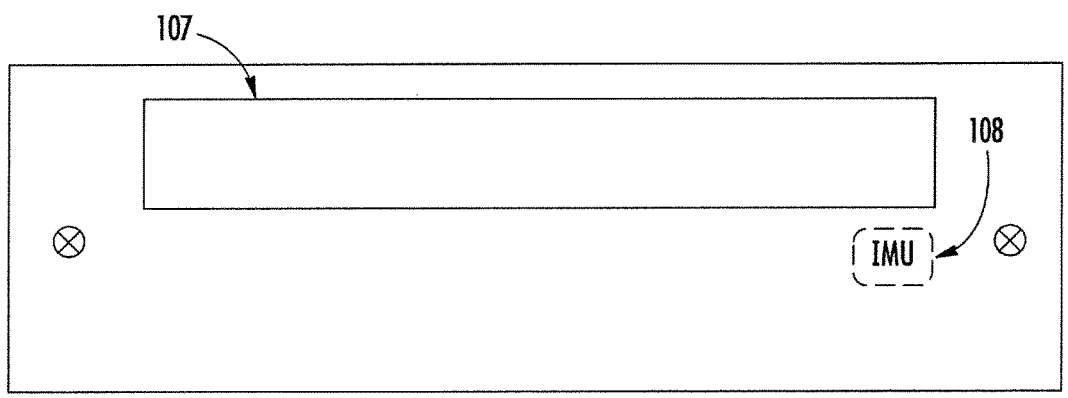
Figure 18:
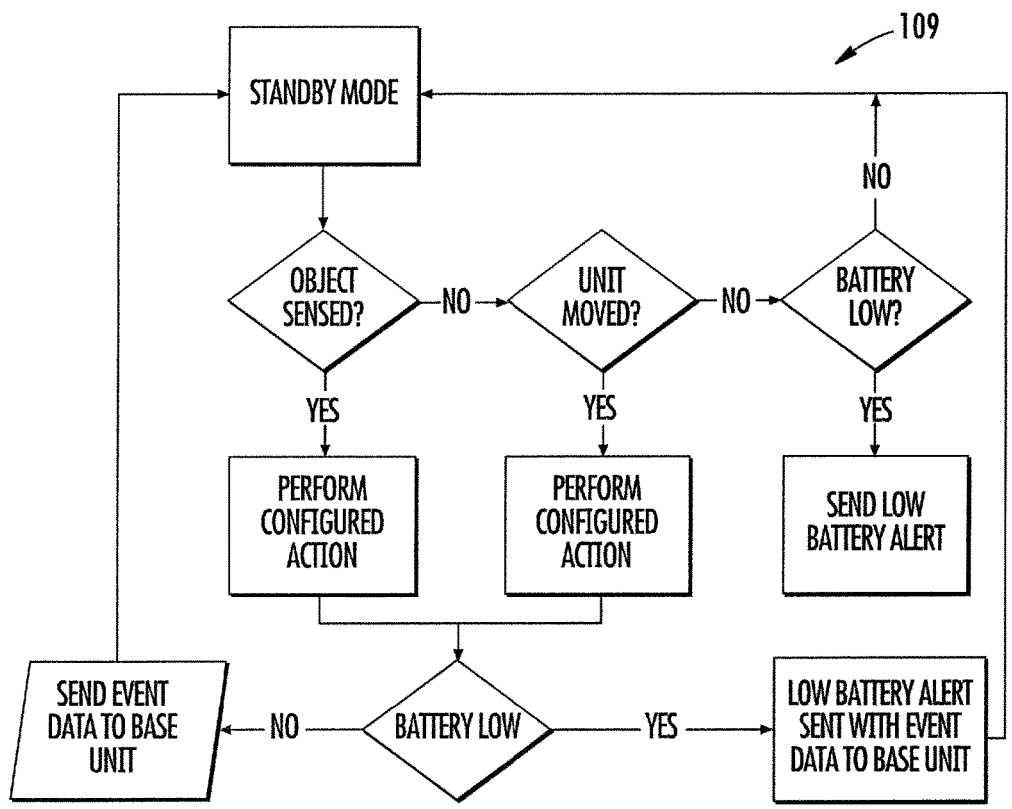
FIGS. 18-19 are flowcharts of operation in the system, according to the present disclosure.
Figure 19:
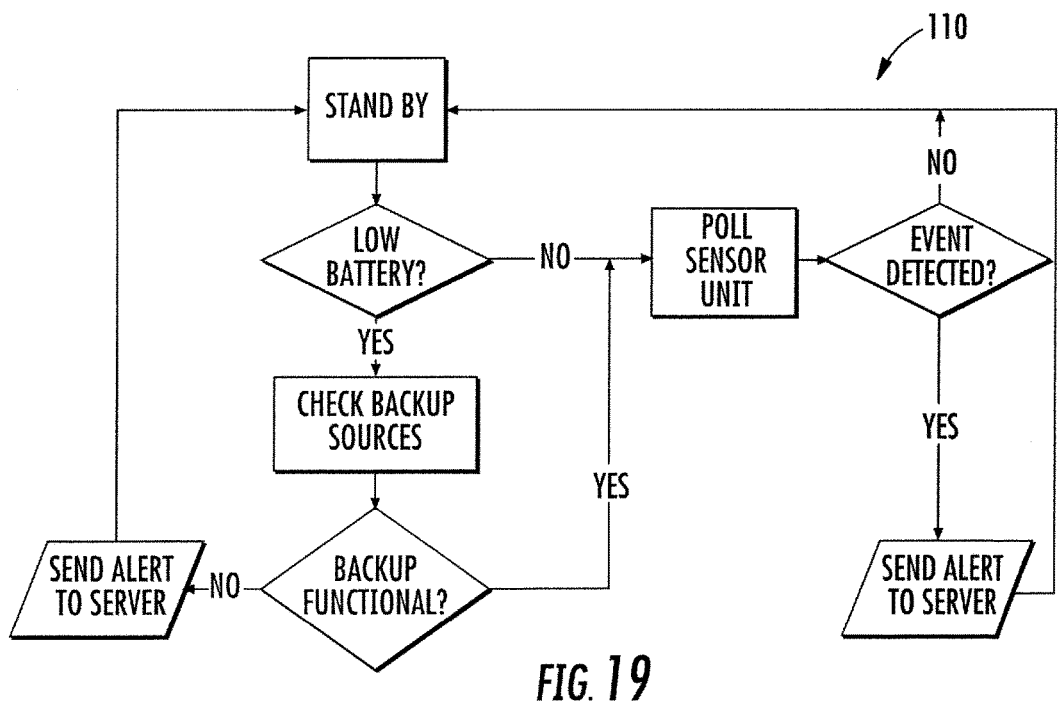

With Reference to FIGS. 15-22 and flowcharts 109, 110, the universal reader unit assembly contains the communication system 106 used for communicating with companion smart sensor devices. The wireless link shall support the Bluetooth, UHF, VHF and LTE communication protocol. With reference to FIG. 16, the proximity tag 102 illustratively includes a solar unit 103 for harvesting energy, a nearfield proximity sensor 104 to alert to persons coming in close proximity or entering and leaving a room, a camera 106, and a microphone 105 for remote visual inspection by a networked operator. The proximity tag can be affixed to a bathtub using adhesive 107 and the built in inertial measurement unit 108 shall trigger an alarm if someone falls while in the shower. The chosen antenna and RF substrate are fully compatible with all competing lower-power standards/communication radios. Communications with companion sensor units shall be provided using Bluetooth or WiFi communication standards. Transmissions from portable sensor shall include the nature of the event which prompted the exchange along with sensor data such as captured images or battery status. Information received from the sensor unit shall be relayed to the companion web server and user web app. Physical buttons 105 may be included for toggling of unit and radio power, device pairing, etc. Continuous wave radar 104 senses vitals through phased array antenna. Aided by support vector machine classifiers, vital data abnormalities can be detected and more aware to user. Primary power 103 can be received from standard outlets or powered via building electrical network in wall or ceiling mounting applications. Backup power sources are charged via the primary power sources while in use, backup may also make use of solar energy harvesting methods to obtain charge. All components discussed are contained within the unit housing 107. The housing features a rugged and durable design in addition to being sealed to prevent tampering.

The Multi-Modal Reader is capable of wireless communication with a host of companion sensors and web/cloud services. Communication with smart sensors allows the Multi-Modal reader to receive data such as companion sensor battery life, proximity based alerts, and biometric data based on the sensors deployed and the needs of the user. Pertinent data can be sent to the user through the use of web technologies and services. Internet connectivity also allows for remote monitoring and configuration of devices paired with the Multi-Modal Reader.

With reference to FIG. 3, the Multi-Modal Reader features personnel identification capabilities though reading from connected devices. Personnel in the vicinity wearing Bluetooth or RF tags can be identified through the unique signatures used by each protocol. In the case of Bluetooth, devices have a Universally Unique ID (UUID) used to discern each tag. Such tags can be worn on personnel. Additional methods of personnel ID make use of WiFi. Personal devices such as cellular phones with WiFi enabled passive listen for access points to share availability information with nearby devices, upon finding an access point broadcast request are sent to the access point. During both processes identifiers, such as device hostname and MAC address are shared. The multi-modal nature of the reader allows for scanning as both a host access point or non-host device in search of a network.

The sensor is capable of breather-detection using the continuous wave radar where the microprocessor commands the synthesizer to sweep a (3%) bandwidth from a nominal carrier at a constant PRF rate. The waveform is transmitted using a patch antenna and the Doppler reflections are received via a circulator or four-port coupler for processing using a software defined radio in the processor. Such a method will be used to detect a possible distress signal from a sleeping infant.

Figure 20:
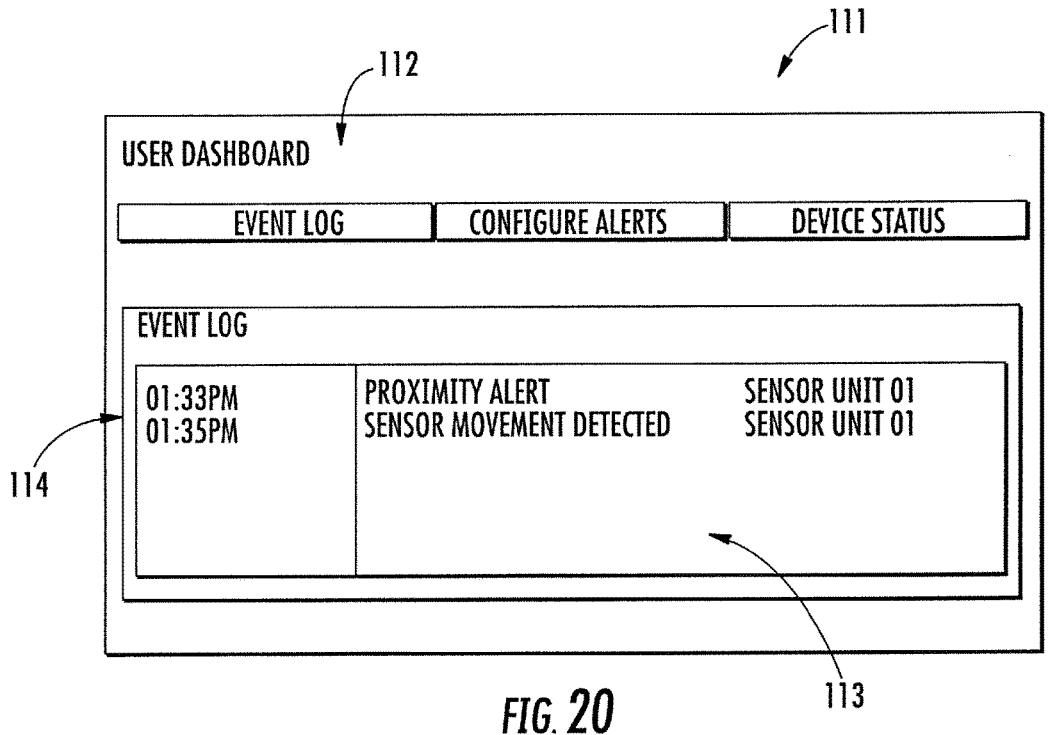
FIGS. 20-22 are views of the interface from the server in the system, according to the present disclosure.
Figure 21:
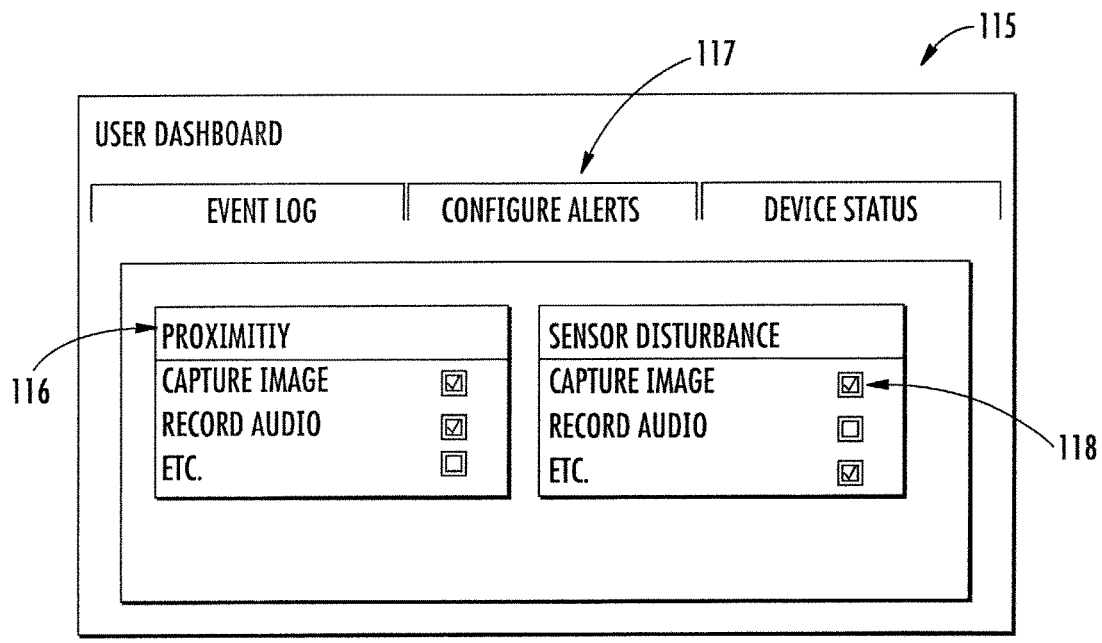
Figure 22:
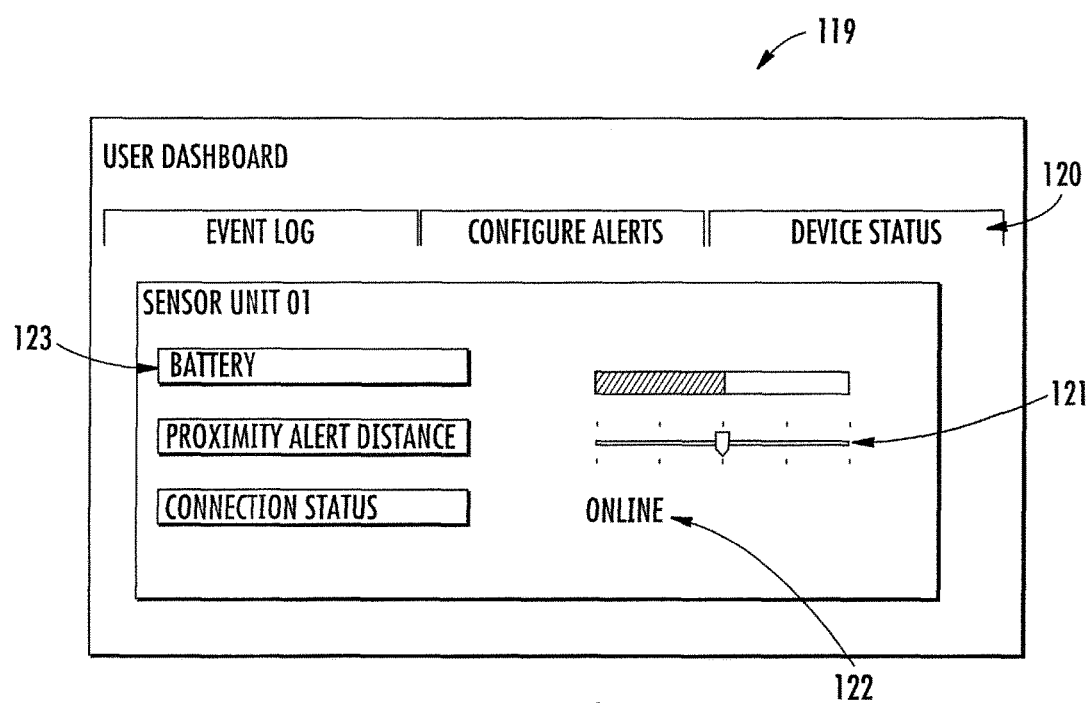

With Reference to FIGS. 20-22, shown is an illustration of the event logging features of the user dashboard. The user dashboard 111 allows users to interact with the cloud/web server capabilities of the systems. Event log section 112 of the dash contains a record of events generated by the units. Event timestamps 114 received from the Multi-Modal Reader unit, referenced in FIG. 1, gives information on when the events occurred. Listed alongside the event timestamp is the event type 113 and the smart sensor unit which recorded said event. The labeling of the smart sensor unit which recorded the event leaves room for additional sensor units to be used with the system.

The Patient Monitoring system shall make use of a Cloud/web based application that allows the user to monitor patient vitals and status in addition to setting events or/and alerts based on user defined conditions. Application shall feature a dashboard 115 which shows the name of all patients or monitor persons currently wearing an active wearable 117. Information on each patient shall be available to the user 116, this information includes patient status such as vitals or biometrics in addition to user defined events or/and alerts, such as a detected fall. Users will also have the ability to set alerts and monitor conditions such as progress towards daily physical activity 118. Dashboard 119 includes a device status tab 120 with status features 121-123.

The companion reader is intended to assist with geofencing and localized reads to within a sub region of a larger building. To facilitate this mode, multiple antennae is used on the said reader to eliminate false reads due to multi-path and other signals picked up from outside the room. The onboard path antenna scans the power emanating from a tag, the reader then switches to an off-board antenna that is cavity backed to beam form and pickup any signals emanating from behind the reader, the third off-board antenna directs for power emanating from side lobes or any other energy causing reflections into the main antenna beam. An onboard algorithm weights the strength of main antennae against the reflection antennae and returns a positive read if the Received Signal Strength Indicator (RSSI) value weights higher than the root-sum-square of the other antennae. By locating the antennae off-board, customized RF solutions can consider unique features of certain building structures.

The passive infrared (PIR) and active infrared (IR) sensors are intended to assist with false positives and improve the detection of humanoid forms within a room. The PIR unit (1) primary function is to alert the system to the presence of motion in the room in the absence of a compliant person wearing radio tag. Subsequently the IR sensor then scans the room via a servo motor attempting to lock on to moving objects by measuring the time-of-flight of the signal as reflected from objects and persons in the room. Stationary objects can be rejected in this sense.

An IOT based monitoring device uses RF technologies to communicate with additional sensors to determine conditions of persons of objects in an environment. Multiple modal nature allows for WiFi, cellular, and Bluetooth scanning and broadcasting. Exemplary embodiments include proximity based and biometric based sensors which transmits sensor data to device. Generally, the alerts are generated based on nature of data received. Alerts are recorded on cloud services and may be sent to user via short message service (SMS). Additionally, identification via Bluetooth and RF tag reading and cellular MAC and network hostname reading are featured.

Referring now to FIGS. 1 & 23-28, the present invention relates generally to a multi-modal electronic reader for monitoring of persons using biometric signatures and electronic signatures where emitting from smart devices on person. The reader is capable of scanning, reading, and writing over multiple radio protocols and standards interface with existing network infrastructure and via a secure background radio link that polls and maintains the vitality of the reader as to provide critical communications in real time.

In home, office or hospice environments it is desirable to have the ability to remotely monitor equipment and personnel, patients, or clients. To date there exist no universally applicable for monitoring the stated environments. For instance, in the case of at home patient monitoring many prior attempts allow limited patient location tracking or monitor only physiological data, such as heart rate or blood pressure, for use of healthcare officials. In such a situation, it is desirable to know if the patient has sustained a fall or attempted to leave the premises. In the case of home or office environments another problem may involve allowing a person access to room while ensuring no attempts are made to access sensitive or potentially dangerous equipment. While some monitoring systems will provide a recording when personnel enter the area, this become impractical if the person in question is allow access to the room but not all equipment contained within.

To address these problems an IOT based sensor approach is desirable. Using an 'always connected' sensor that supports remote access and configuration over a network allows users to monitor conditions and receive real-time alerts while away from the vicinity. Furthermore, a host sensor capable of reading other smart devices and sensors allows for a mesh network of smart devices. Such a network expanding the area and conditions under monitor less daunting.

Generally described, the present invention includes multiple modes of communication including WiFi scanning and broadcasting and Bluetooth communication for use with additional home monitoring smart devices. Additionally, the invention makes use of the provided RF technologies for the identification of persons in the vicinity of the monitored area. Continuous wave radar is implemented to allow for additional monitoring features, such as vital monitoring.

The Multi-Modal includes communication over Bluetooth, WiFi, and cellular. This permits the reader to communicate with smart devices, more particularly, companion smart device made for use in monitoring persons or equipment remotely.

Additionally, WiFi and cellular modes of communication allow the reader to access webservers where data gather by the reader or companion smart devices can be stored and made available for the user. The use of web and cloud technologies allows for remote monitoring and real-time alerts that shall be sent to the user.

Identification methods within the reader are provided by Bluetooth and WiFi support. Each the aforementioned technologies contained unique identifies which allows devices to discern between two devices communicating using the same protocols. These unique identifies shall be used for identifying persons in the vicinity of the device. Vital monitoring features with the reader are provided by novel use of a continuous wave radar to sense vital signals, such as breathing.

Reader unit is powered through home or office outlets. Additionally, the reader can be wired into the main electrical network of a building when wall or ceiling mounted. Secondary sources of power include rechargeable power sources. These secondary power sources can be recharged via solar energy harvesting methods and trickle charge while primary power sources are active. This provides a backup power source in the base of power outages. In the event of complete power loss, the user shall be made aware of the system's status. Additionally, if universal reader unit is removed from primary power source it shall continue to operate so long of the secondary sources are active, users shall be made aware when removed from primary power source occurs.

Smart device data transmitted to reader unit is relayed to web app/servers or cloud solutions. Depending on use case, allows for real-time monitoring or datamining applications. The web application is a user accessible hub or dashboard where system behavior is customized. Additionally, this hub holds and displays alert information such as time of event, nature of the event, images captured during event if applicable, and audio recordings during event if applicable. Where if applicable means if the system is configured to take the specified action during the event.

Figure 23:
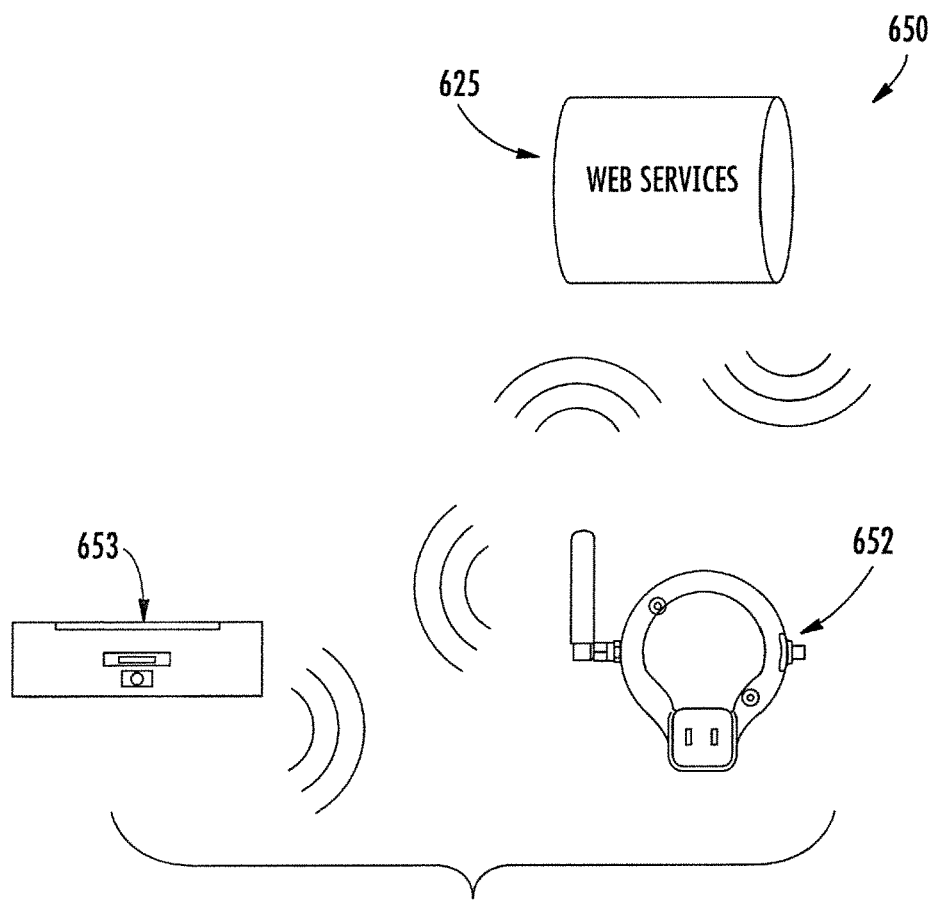
FIGS. 23-25 are schematic diagrams of another embodiment of the system, according to the present disclosure.

With Reference to FIG. 23, the universal reader unit assembly contains the communication system used for communicating with companion smart sensor devices. The wireless link shall support the Bluetooth, UHF, VHF and LTE communication protocol. The chosen antenna and RF substrate are fully compatible with all competing lower-power standards/communication radios. Communications with companion sensor units shall be provided using Bluetooth or WiFi communication standards. Transmissions from portable sensor shall include the nature of the event which prompted the exchange along with sensor data such as captured images or battery status. Information received from the sensor unit shall be relayed to the companion web server and user web app. Physical buttons may be included for toggling of unit and radio power, device pairing, etc. Continuous wave radar senses vitals through phased array antenna. Aided by support vector machine classifiers, vital data abnormalities can be detected and more aware to user. Primary power can be received from standard outlets or powered via building electrical network in wall or ceiling mounting applications. Backup power sources are charged via the primary power sources while in use, backup may also make use of solar energy harvesting methods to obtain charge. All components discussed are contained within the unit housing. The housing features a rugged and durable design in addition to being sealed to prevent tampering.

With reference to FIG. 23, the system 650 illustratively includes a Multi-Modal Reader 652 capable of wireless communication with a host of companion sensors 653 and web/cloud services 625. Communication with smart sensors allows the Multi-Modal reader to receive data such as companion sensor battery life, proximity based alerts, and biometric data based on the sensors deployed and the needs of the user 654. Pertinent data can be sent to the user through the use of web technologies and services. Internet connectivity also allows for remote monitoring and configuration of devices paired with the Multi-Modal Reader.

Figure 24:
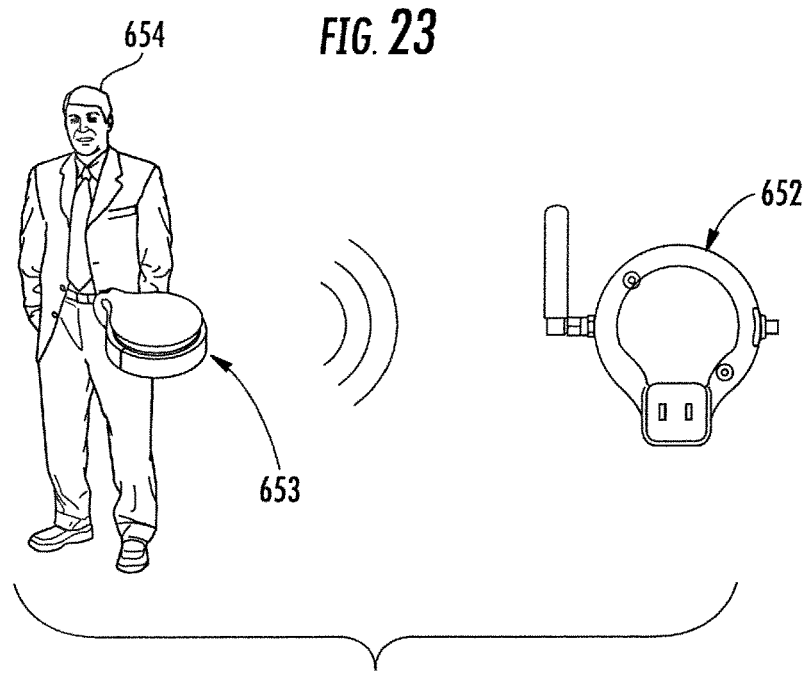

With reference to FIG. 24, the Multi-Modal Reader 652 features personnel identification capabilities though reading from connected devices. Personnel in the vicinity wearing Bluetooth or RF tags can be identified through the unique signatures used by each protocol. In the case of Bluetooth, devices have an UUID or Universally Unique ID used to discern each tag. Such tags can be worn on personnel. Additional methods of personnel ID make use of WiFi. Personal devices such as cellular phones with WiFi enabled passive listen for access points to share availability information with nearby devices, upon finding an access point broadcast request are sent to the access point. During both processes, identifiers, such as device hostname and MAC address, are shared. The multi-modal nature of the reader allows for scanning as both a host access point or non-host device in search of a network.

Figure 25:
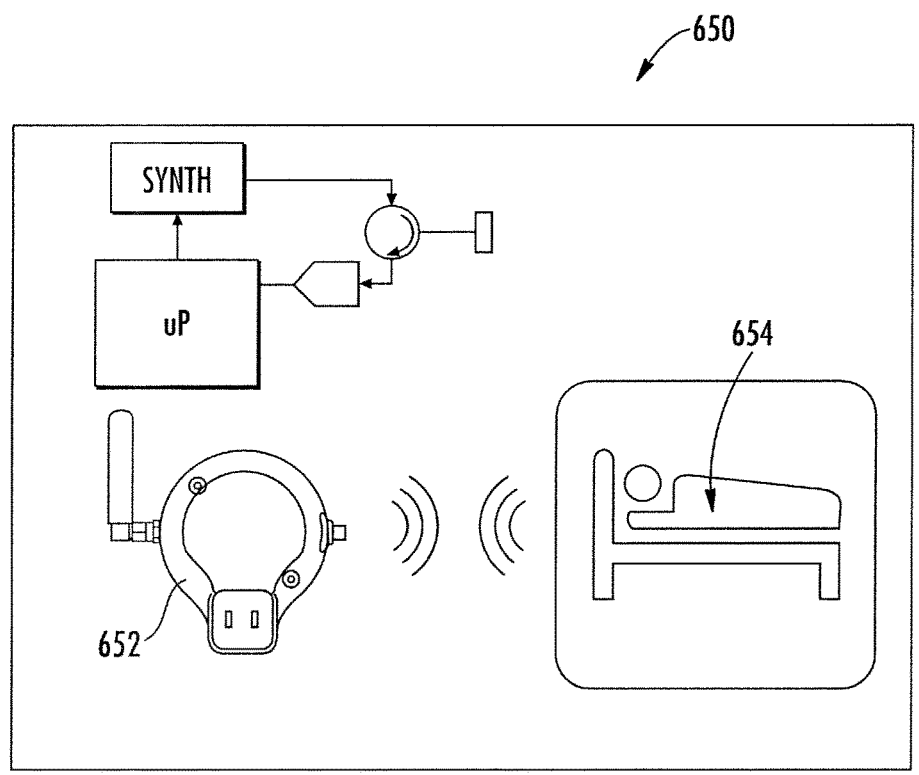

In FIG. 25, the sensor is capable of breather-detection using the continuous wave radar where the microprocessor commands the synthesizer to sweep a (3%) bandwidth from a nominal carrier at a constant PRF rate. The waveform is transmitted using a patch antenna and the Doppler reflections are received via a circulator or four-port coupler for processing using a software defined radio in the processor. Such a method will be used to detect a possible distress signal from a sleeping infant.

Figure 26:
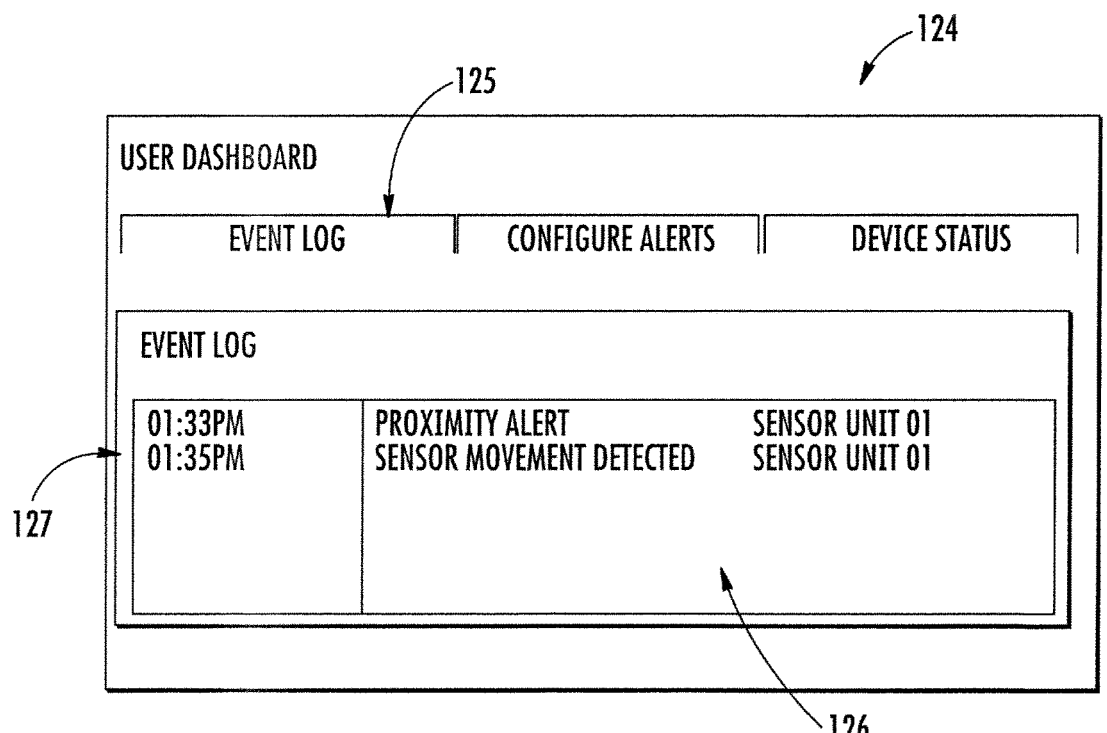
FIG. 26 is a view of the interface from the server in the system, according to the present disclosure.

With reference to FIG. 26, shown is an illustration 124 of the event logging features of the user dashboard. The user dashboard allows users to interact with the cloud/web server capabilities of the systems. Event log section 125 of the dash contains a record of events generated by the units. Event timestamps 127 received from the Multi-Modal Reader unit, referenced in FIG. 1, gives information on when the events occurred. Listed alongside the event timestamp is the event type 126 and the smart sensor unit which recorded said event. The labeling of the smart sensor unit which recorded the event leaves room for additional sensor units to be used with the system.

The Patient Monitoring system shall make use of a Cloud/web based application that allows the user to monitor patient vitals and status in addition to setting events or/and alerts based on user defined conditions. Application shall feature a dashboard which shows the name of all patients or monitor persons currently wearing an active wearable. Information on each patient shall be available to the user, this information includes patient status such as vitals or biometrics in addition to user defined events or/and alerts, such as a detected fall. Users will also have the ability to set alerts and monitor conditions such as progress towards daily physical activity.

The companion reader is intended to assist with geofencing and localized reads to within a sub region of a larger building. To facilitate this mode, multiple antennae is used on the said reader to eliminate false reads due to multi-path and other signals picked up from outside the room. The onboard path antenna scans the power emanating from a tag, the reader then switches to an off-board antenna that is cavity backed to beam form and pickup any signals emanating from behind the reader, the third off-board antenna directs for power emanating from side lobes or any other energy causing reflections into the main antenna beam. An onboard algorithm weights the strength of main antenna against the reflection antennae and returns a positive read if the RSSI value weights higher than the root-sum-square of the other antennae. By locating the antennae off-board, customized RF solutions can consider unique features of certain building structures.

Figure 27:
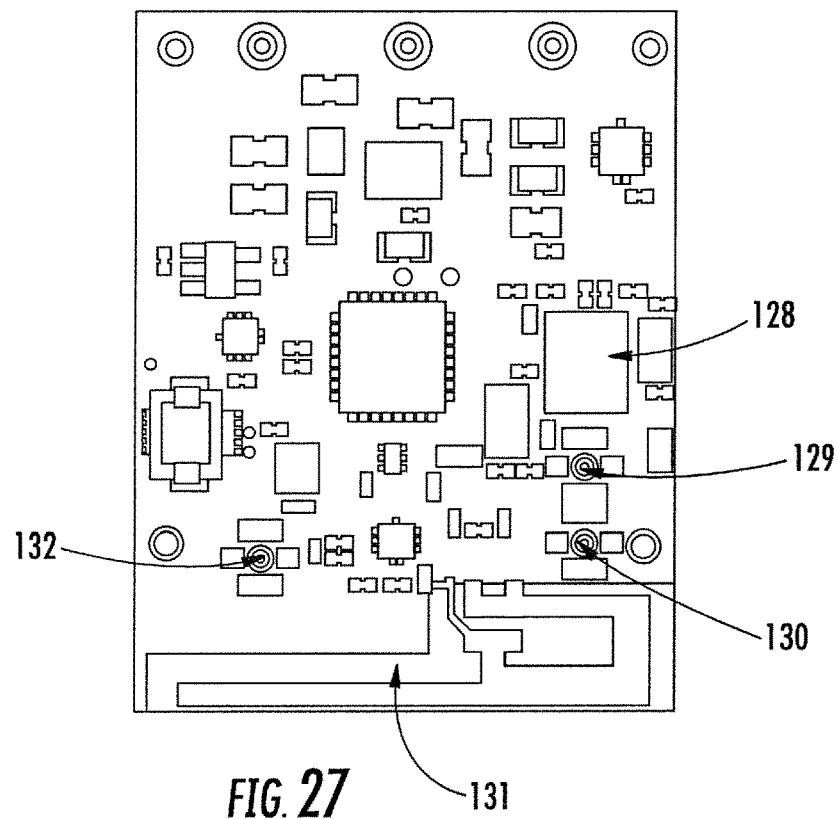
FIG. 27-28 are schematic circuit diagrams of yet another embodiment of the personal monitoring device, according to the present disclosure.
Figure 28:
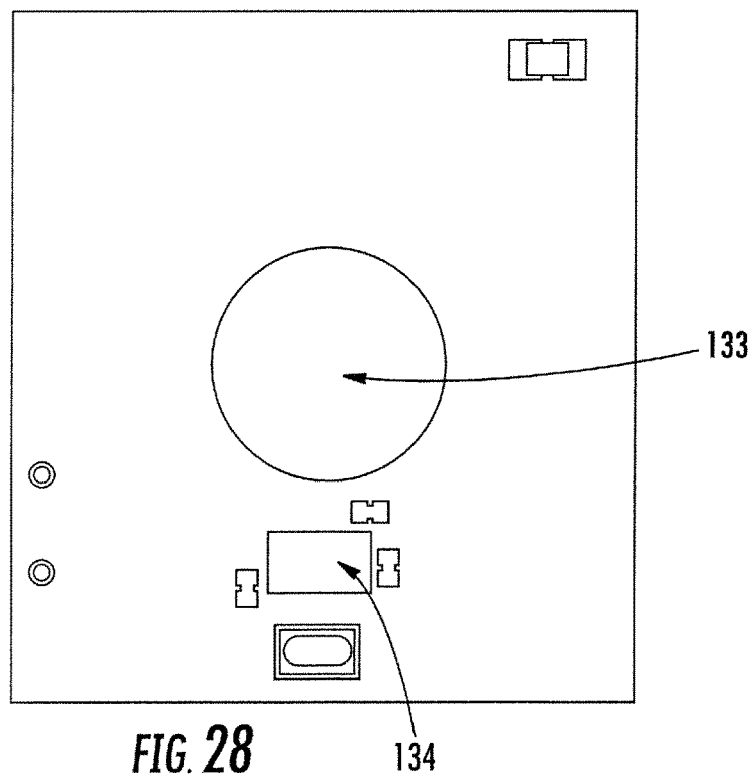

In FIGS. 27-28 (128-134), the passive infrared (PIR) 133 and active IR 134 sensors are intended to assist with false positives and improve the detection of humanoid forms within a room. The PIR unit primary function is to alert the system to the presence of motion in the room in the absence of a compliant person wearing radio tag. Subsequently the IR sensor then scans the room via a servo motor attempting to lock on to moving objects by measuring the time-of-flight of the signal as reflected from objects and persons in the room. Stationary objects can be rejected in this sense. For monitored persons wearing the radio tag, primary omnidirectional antenna 131 scans for all tags within line-of-sight or near side of the room. Collocated in the rear of the unit is a cavity backed antenna 130 with beam pattern that couples with the wall and is intended to help reject tags are in the hallway versus in the actual room.

This invention relates to the design of a personal area protection system that uses proximity as the discriminate for providing real-time alerts to the end user. There is a need for localized personal area protection sensors that provide more granular monitoring of a room or asset that goes beyond the basic triggering when someone is inside a room/within to close a proximity of a protected asset. To further this example, consider a patron to close to a picture at a museum, or a child having free reign of a parent's room with the exception of having permission to enter a gun drawer. The said sensor will alert the end user based on user configurable proximity bands. The said sensor is configurable in how and number of alert methods afforded the end user. The said sensor is tamper proof and alerts on the intentional obstruction, or if perimeter is no longer under protection due to power outages etc., by maintaining a constant heartbeat with the perimeter tag control unit and 24/7 cloud monitoring system.

Figure 29:
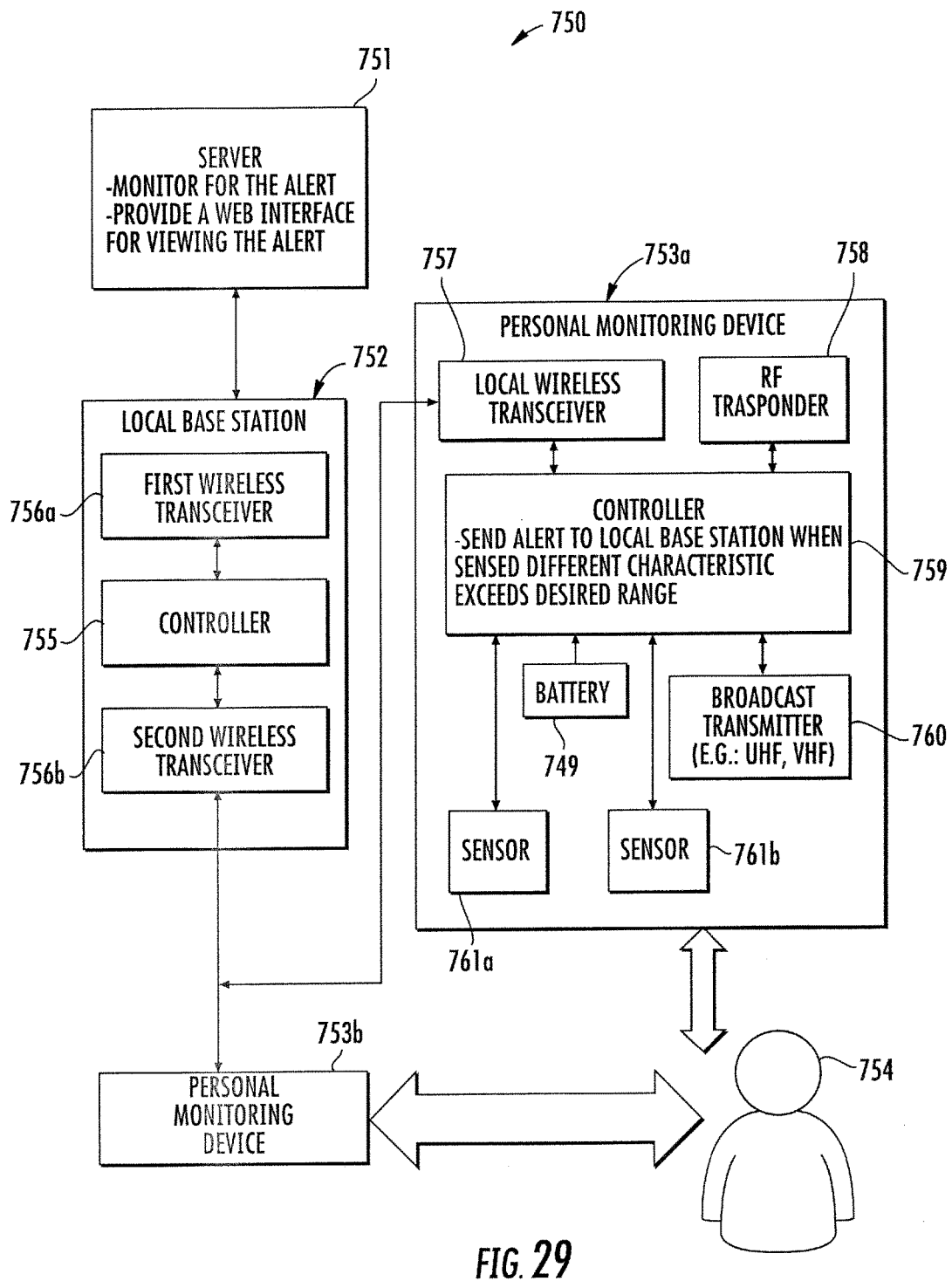
FIG. 29 is a schematic diagram of another embodiment of the system, according to the present disclosure.

Referring now additionally to FIG. 29, another embodiment of a system 750 is now described. In this embodiment of the system 750, those elements already discussed above with respect to FIGS. 1-28 are incremented by 700 and most require no further discussion herein. This embodiment differs from the previous embodiment in that this system 750 illustratively is for monitoring a state of a user 754. The system 750 includes a server 751, and a local base station 752 in communication with the server. The local base station 752 illustratively includes first and second wireless transceivers 756a-756b, and a controller 755 coupled to the first and second wireless transceivers. The first wireless transceiver 756a is configured to communicate with the server 751 over an external network.

The system 750 illustratively includes a plurality of personal monitoring devices 753a-753b adjacent the user 754. The personal monitoring device 753a includes a local wireless transceiver 757 configured to communicate with the second wireless transceiver 756b of the local base station 752, a plurality of sensors 761a-761b configured to monitor a corresponding plurality of different characteristics of the user 754, each different characteristic having a desired range, and a controller 759 coupled to the local wireless transceiver and the plurality of sensors. The controller 759 is configured to send an alert to the local base station 752 when at least one different characteristic exceeds a respective desired range.

The local base station 752 may be configured to relay the alert to the server 751, and the server may be configured to monitor for the alert, and provide a web interface for viewing the alert. The personal monitoring device 753a illustratively includes a broadcast transmitter 760 coupled to the controller 759 and configured to broadcast a beacon alert when outside a range of the local base station 752. The broadcast transmitter 760 may include at least one of a very high frequency (VHF) transmitter and an ultra-high frequency (UHF) transmitter.

The local wireless transceiver 757 may be configured to transmit a beacon alert to a mobile wireless communications device (not shown) of the user 754 when outside a range of the local base station 752. The corresponding plurality of different characteristics may comprise a heartrate of the user, movement of the user, ultraviolet (UV) exposure of the user, a breathing pattern of the user, and a geolocation of the user. The plurality of sensors 761a-761b may include a continuous wave radar sensor configured to monitor the breathing pattern of the user.

The personal monitoring device 753a may be carried by the user 754 and has at least one of a bracelet form factor and a pendant form factor. The personal monitoring device 753a illustratively includes a passive radio frequency (RF) transponder 758 coupled to the controller 759.

In some embodiments, the personal monitoring device 753a illustratively includes a battery 749 coupled to the local wireless transceiver 757, the plurality of sensors 761a-761b, and the controller 759.

Another aspect is directed to a method for making a system 750 for monitoring a state of a user 754. The method comprises providing a local base station 752 including first and second wireless transceivers 756a-756b, the first wireless transceiver configured to communicate with a server 751 over an external network, and providing at least one personal monitoring device 753a-753b adjacent the user. The at least one personal monitoring device 753a-753b includes at least one local wireless transceiver 757 configured to communicate with the second wireless transceiver 756b of the local base station 752, a plurality of sensors 761a-761b configured to monitor a corresponding plurality of different characteristics of the user 754, each different characteristic having a desired range, and a controller 759 coupled to the at least one local wireless transceiver and the plurality of sensors. The controller 759 is configured to send an alert to the local base station 752 when at least one different characteristic exceeds a respective desired range.

Many modifications and other embodiments of the present disclosure will come to the mind of one skilled in the art having the benefit of the teachings presented in the foregoing descriptions and the associated drawings. Therefore, it is understood that the present disclosure is not to be limited to the specific embodiments disclosed, and that modifications and embodiments are intended to be included within the scope of the appended claims.

That which is claimed is:

1. A system for monitoring a state of a user, the system comprising:
    a server;
    a local base station comprising first and second wireless transceivers, the second wireless transceiver operating on a different operational frequency than that of said first wireless transceiver, said first wireless transceiver configured to communicate with said server; and
    at least one personal monitoring device adjacent the user and comprising
        at least one local wireless transceiver configured to
            communicate with said second wireless transceiver of said local base station,
            provide a connection between said at least one personal monitoring device and said server, and
            transmit a beacon alert to a mobile wireless communications device of the user when outside a range of said local base station,
        at least one sensor configured to monitor at least one user characteristic, the at least one user characteristic having a desired range, and
        a controller coupled to said at least one local wireless transceiver and said at least one sensor,
        said controller configured to send an alert to said local base station when at least one different characteristic exceeds a respective desired range.

2. The system of claim 1 wherein said local base station is configured to relay the alert to said server.

3. The system of claim 1 wherein said at least one personal monitoring device comprises a broadcast transmitter coupled to said controller and configured to broadcast the beacon alert when outside the range of said local base station.

4. The system of claim 3 wherein said broadcast transmitter comprises at least one of a very high frequency (VHF) transmitter and an ultra-high frequency (UHF) transmitter.

5. The system of claim 1 wherein said local base station is configured to determine a sub-room location of said at least one personal monitoring device.

6. The system of claim 1 wherein the at least one user characteristic comprises one or more of a heartrate of the user, movement of the user, ultraviolet (UV) exposure of the user, a breathing pattern of the user, and a geolocation of the user.

7. The system of claim 6 wherein said at least one sensor comprises a radar sensor configured to monitor the breathing pattern of the user.

8. The system of claim 1 wherein said at least one personal monitoring device is carried by the user and has at least one of a bracelet form factor and a pendant form factor.

9. The system of claim 1 wherein said at least one personal monitoring device comprises a passive radio frequency (RF) transponder coupled to said controller.

10. A system for monitoring a state of a user, the system comprising:
    a server;
    a local base station comprising first and second wireless transceivers, said first wireless transceiver configured to communicate with said server, the second wireless transceiver operating on a different operational frequency than that of said first wireless transceiver; and
    at least one personal monitoring device carried by the user and comprising
        at least one local wireless transceiver configured to
            communicate with said second wireless transceiver of said local base station,
            provide a connection between said at least one personal monitoring device and said server, and
            transmit a beacon alert to a mobile wireless communications device of the user when outside a range of said local base station,
        at least one sensor configured to monitor at least one user characteristic, the at least one user characteristic having a desired range,
        a controller coupled to said at least one local wireless transceiver and said at least one sensor, and
        a battery coupled to said at least one local wireless transceiver, said at least one sensor, and said controller;
        said controller configured to send an alert to said local base station when at least one different characteristic exceeds a respective desired range.

11. The system of claim 10 wherein said local base station is configured to relay the alert to said server.

12. The system of claim 10 wherein said at least one personal monitoring device comprises a broadcast transmitter coupled to said controller and configured to broadcast the beacon alert when outside the range of said local base station.

13. The system of claim 12 wherein said broadcast transmitter comprises at least one of a very high frequency (VHF) transmitter and an ultra-high frequency (UHF) transmitter.

14. The system of claim 10 wherein said local base station is configured to determine a sub-room location of said at least one personal monitoring device.

15. The system of claim 10 wherein the at least one user characteristic comprises one or more of a heartrate of the user, movement of the user, ultraviolet (UV) exposure of the user, a breathing pattern of the user, and a geolocation of the user.

16. The system of claim 15 wherein said at least one sensor comprises a radar sensor configured to monitor the breathing pattern of the user.

17. The system of claim 10 wherein said at least one personal monitoring device comprises a passive radio frequency (RF) transponder coupled to said controller.

18. A method for making a system for monitoring a state of a user, the method comprising:

providing a local base station comprising first and second wireless transceivers, the first wireless transceiver configured to communicate with a server, the second wireless transceiver operating on a different operational frequency than that of the first wireless transceiver; and providing at least one personal monitoring device adjacent the user, the at least one personal monitoring device comprising at least one local wireless transceiver configured to communicate with the second wireless transceiver of the local base station, provide a connection between the at least one personal monitoring device and the server, and transmit a beacon alert to a mobile wireless communications device of the user when outside a range of the local base station, at least one sensor configured to monitor at least one user characteristic, the at least one user characteristic having a desired range, and a controller coupled to the at least one local wireless transceiver and the at least one sensor, the controller configured to send an alert to the local base station when at least one different characteristic exceeds a respective desired range.

19. The method of claim 18 wherein the local base station is configured to relay the alert to the server.

20. The method of claim 18 wherein the at least one personal monitoring device comprises a broadcast transmitter coupled to the controller and configured to broadcast the beacon alert when outside the range of the local base station.

\* \* \* \* \*